(12) United States Patent
Petite

(10) Patent No.: US 7,397,907 B2
(45) Date of Patent: Jul. 8, 2008

(54) MULTI-FUNCTION GENERAL PURPOSE TRANSCEIVER

(75) Inventor: Thomas D. Petite, Douglasville, GA (US)

(73) Assignee: Sipco, LLC, Atlanta, GA (US)

( * ) Notice: Subject to any disclaimer, the term of this patent is extended or adjusted under 35 U.S.C. 154(b) by 0 days.

(21) Appl. No.: 09/756,386

(22) Filed: Jan. 8, 2001

(65) Prior Publication Data

US 2001/0002210 A1 May 31, 2001

Related U.S. Application Data

(63) Continuation of application No. 09/102,399, filed on Jun. 22, 1998, now Pat. No. 6,233,327, which is a continuation-in-part of application No. 08/910,980, filed on Aug. 7, 1997, now abandoned, which is a continuation-in-part of application No. 08/895,720, filed on Jul. 17, 1997, now Pat. No. 5,926,531, which is a continuation-in-part of application No. 08/825,576, filed on Mar. 31, 1997, now Pat. No. 7,137,550.

(60) Provisional application No. 60/059,643, filed on Sep. 20, 1997, provisional application No. 60/040,316, filed on Feb. 14, 1997.

(51) Int. Cl.
*H04M 17/00* (2006.01)

(52) U.S. Cl. .......................... 379/155; 379/40; 379/39; 379/143

(58) Field of Classification Search ............... 379/33, 379/39, 40, 43–45, 47, 144.05, 144.01, 49, 379/51, 52, 56.3, 143, 155
See application file for complete search history.

(56) References Cited

U.S. PATENT DOCUMENTS 3,665,475 A 5/1972 Gram (Continued)

FOREIGN PATENT DOCUMENTS

EP 0718954 6/1996

(Continued)

OTHER PUBLICATIONS

Brownrigg, Edwin, "User Provided Access to the Internet,", Open Access Solutions, http://web.simmons.edu/chen/nit/NIT'92/033-bro.htm, Jun. 8, 2005-Jun. 9, 2005.

(Continued)

*Primary Examiner*—Binh K. Tieu
(74) *Attorney, Agent, or Firm*—Troutman Sanders LLP; James Hunt Yancey, Jr.; Filip A. Kowalewski

(57) ABSTRACT

The present invention is generally directed to a system and associated method for communicating information to a predetermined location. The system includes a transmitter disposed at a first location and configured to transmit a signal containing an instruction code that uniquely identifies an instruction to be carried out. The system further includes a transceiver disposed remotely from the transmitter and configured to receive the transmitted signal. The transceiver circuit includes a line interface circuit configured to interface with a telephone line that is part of the public switched telephone network (PSTN) and initiate a phone call over the telephone line. Finally, the system includes a central station remotely located from said transceiver but being in communication with said transceiver via the PSTN The central station further include a decoder configured to decode the instruction code. In accordance with a broader aspect, the invention is directed to a general purpose transceiver having a receiver for receiving an information signal and a transmitter configured to transmit an outgoing signal over a phone line to a central station A portion of the information signal includes an instruction code, which may be decoded by the central station and acted upon accordingly Consistent with the general purpose nature of the transceiver, the phone number of the central station may be transmitted to the transceiver as part of the information signal.

37 Claims, 10 Drawing Sheets

U.S. PATENT DOCUMENTS

| | | | |
|---|---|---|---|
| 3,705,385 A | 12/1972 | Batz | |
| 3,723,876 A | 3/1973 | Seaborn, Jr. | |
| 3,742,142 A | 6/1973 | Martin | |
| 3,848,231 A | 11/1974 | Wooten | |
| 3,892,948 A | 7/1975 | Constable | |
| 3,906,460 A | 9/1975 | Halpern | |
| 3,914,692 A | 10/1975 | Seaborn, Jr. | |
| 3,922,492 A | 11/1975 | Lumsden | |
| 3,925,763 A | 12/1975 | Wadwhani et al. | |
| 4,025,315 A | 5/1977 | Mazelli | |
| 4,056,684 A * | 11/1977 | Lindstrom | 379/34 |
| 4,058,672 A | 11/1977 | Crager et al. | |
| 4,083,003 A | 4/1978 | Haemmig | |
| 4,120,452 A | 10/1978 | Kimura et al. | |
| 4,124,839 A | 11/1978 | Cohen | |
| 4,135,181 A | 1/1979 | Bogacki et al. | |
| 4,204,195 A | 5/1980 | Bogacki | |
| 4,213,119 A | 7/1980 | Ward et al. | |
| 4,277,837 A | 7/1981 | Stuckert | |
| 4,278,975 A | 7/1981 | Kimura et al. | |
| 4,354,181 A | 10/1982 | Spletzer | |
| 4,396,910 A | 8/1983 | Enemark et al. | |
| 4,396,915 A | 8/1983 | Farnsworth et al. | |
| 4,417,450 A | 11/1983 | Morgan, Jr. et al. | |
| 4,436,957 A | 3/1984 | Mazza | |
| 4,446,454 A | 5/1984 | Pyle | |
| 4,454,414 A | 6/1984 | Benton | |
| 4,468,656 A | 8/1984 | Clifford et al. | |
| 4,488,152 A | 12/1984 | Arnason et al. | |
| 4,495,496 A | 1/1985 | Miller, III | |
| 4,551,719 A | 11/1985 | Carlin et al. | |
| 4,611,198 A | 9/1986 | Levinson et al. | |
| 4,621,263 A | 11/1986 | Takenaka et al. | |
| 4,630,035 A | 12/1986 | Stahl et al. | |
| 4,631,357 A | 12/1986 | Grunig | |
| 4,670,739 A | 6/1987 | Kelly, Jr. | |
| 4,707,852 A * | 11/1987 | Jar et al. | 379/107 |
| 4,731,810 A | 3/1988 | Watkins | |
| 4,742,296 A | 5/1988 | Petr et al. | |
| 4,757,185 A | 7/1988 | Onishi | |
| 4,788,721 A | 11/1988 | Krishnan et al. | |
| 4,800,543 A | 1/1989 | Lyndon-James et al. | |
| 4,825,457 A | 4/1989 | Lebowitz | |
| 4,829,561 A | 5/1989 | Matheny | |
| 4,849,815 A | 7/1989 | Streck | |
| 4,851,654 A | 7/1989 | Nitta | |
| 4,856,046 A | 8/1989 | Streck et al. | |
| 4,857,912 A | 8/1989 | Everett, Jr. et al. | |
| 4,875,231 A | 10/1989 | Hara et al. | |
| 4,884,123 A | 11/1989 | Morris et al. | |
| 4,897,644 A | 1/1990 | Hirano | |
| 4,906,828 A | 3/1990 | Halpern | |
| 4,908,769 A | 3/1990 | Vaughan et al. | |
| 4,918,690 A | 4/1990 | Markkula, Jr. et al. | |
| 4,918,995 A | 4/1990 | Pearman et al. | |
| 4,928,299 A | 5/1990 | Tansky et al. | |
| 4,939,726 A | 7/1990 | Flammer et al. | |
| 4,940,976 A | 7/1990 | Gastouniotis et al. | |
| 4,949,077 A | 8/1990 | Mbuthia | |
| 4,952,928 A | 8/1990 | Carroll et al. | |
| 4,962,496 A | 10/1990 | Vercellotti et al. | |
| 4,967,366 A | 10/1990 | Kaehler | |
| 4,968,970 A | 11/1990 | LaPorte | |
| 4,968,978 A | 11/1990 | Stolarczyk | |
| 4,972,504 A | 11/1990 | Daniel, Jr. et al. | |
| 4,973,957 A | 11/1990 | Shimizu et al. | |
| 4,973,970 A | 11/1990 | Reeser | |
| 4,977,612 A | 12/1990 | Wilson | |
| 4,980,907 A | 12/1990 | Raith et al. | |
| 4,989,230 A | 1/1991 | Gillig et al. | |
| 4,991,008 A | 2/1991 | Nama | |
| 4,993,059 A | 2/1991 | Smith et al. | |
| 4,998,095 A | 3/1991 | Shields | |
| 4,999,607 A | 3/1991 | Evans | |
| 5,007,052 A | 4/1991 | Flammer | |
| 5,032,833 A | 7/1991 | Laporte | |
| 5,038,372 A | 8/1991 | Elms et al. | |
| 5,055,851 A | 10/1991 | Sheffer | |
| 5,057,814 A | 10/1991 | Onan et al. | |
| 5,061,997 A | 10/1991 | Rea et al. | |
| 5,079,768 A | 1/1992 | Flammer | |
| 5,086,391 A | 2/1992 | Chambers | |
| 5,091,713 A | 2/1992 | Horne et al. | |
| 5,111,199 A | 5/1992 | Tomoda et al. | |
| 5,113,183 A | 5/1992 | Mizuno et al. | |
| 5,113,184 A | 5/1992 | Katayama | |
| 5,115,224 A | 5/1992 | Kostusiak et al. | |
| 5,115,433 A | 5/1992 | Baran et al. | |
| 5,124,624 A | 6/1992 | de Vries et al. | |
| 5,128,855 A | 7/1992 | Hilber et al. | |
| 5,130,519 A | 7/1992 | Bush et al. | |
| 5,130,987 A | 7/1992 | Flammer | |
| 5,131,038 A | 7/1992 | Puhl et al. | |
| 5,134,650 A | 7/1992 | Blackmon | |
| 5,136,285 A | 8/1992 | Okuyama | |
| 5,155,481 A | 10/1992 | Brennan, Jr. et al. | |
| 5,159,317 A | 10/1992 | Bray | |
| 5,162,776 A | 11/1992 | Bushnell et al. | |
| 5,177,342 A | 1/1993 | Adams | |
| 5,189,287 A | 2/1993 | Parienti | |
| 5,191,192 A | 3/1993 | Takahira et al. | |
| 5,191,326 A | 3/1993 | Montgomery | |
| 5,193,111 A | 3/1993 | Matty et al. | |
| 5,195,018 A | 3/1993 | Kwon et al. | |
| 5,197,095 A | 3/1993 | Bonnet et al. | |
| 5,200,735 A | 4/1993 | Hines | |
| 5,204,670 A | 4/1993 | Stinton | |
| 5,212,645 A | 5/1993 | Wildes et al. | |
| 5,216,502 A | 6/1993 | Katz | |
| 5,221,838 A | 6/1993 | Gutman et al. | |
| 5,223,844 A | 6/1993 | Mansell et al. | |
| 5,231,658 A | 7/1993 | Eftechiou | |
| 5,235,630 A | 8/1993 | Moody et al. | |
| 5,239,294 A | 8/1993 | Flanders et al. | |
| 5,239,575 A | 8/1993 | White et al. | |
| 5,241,410 A | 8/1993 | Streck et al. | |
| 5,243,338 A | 9/1993 | Brennan, Jr. et al. | |
| 5,245,633 A | 9/1993 | Schwartz et al. | |
| 5,252,967 A | 10/1993 | Brennan et al. | |
| 5,253,167 A | 10/1993 | Yoshida et al. | |
| 5,265,150 A | 11/1993 | Heimkamp et al. | |
| 5,265,162 A | 11/1993 | Bush et al. | |
| 5,266,782 A | 11/1993 | Alanara et al. | |
| 5,272,747 A | 12/1993 | Meads | |
| 5,282,204 A | 1/1994 | Shpancer et al. | |
| 5,282,250 A | 1/1994 | Dent et al. | |
| 5,289,165 A | 2/1994 | Belin | |
| 5,291,516 A | 3/1994 | Dixon et al. | |
| 5,295,154 A | 3/1994 | Meier et al. | |
| 5,305,370 A | 4/1994 | Kearns et al. | |
| 5,309,501 A | 5/1994 | Kozik et al. | |
| 5,315,645 A | 5/1994 | Matheny | |
| 5,317,309 A | 5/1994 | Vercellotti et al. | |
| 5,319,364 A | 6/1994 | Waraksa et al. | |
| 5,319,698 A | 6/1994 | Glidwell et al. | |
| 5,319,711 A | 6/1994 | Servi | |
| 5,323,384 A | 6/1994 | Norwood et al. | |
| 5,325,429 A | 6/1994 | Kurgan | |
| 5,329,394 A | 7/1994 | Calvani et al. | |
| 5,331,318 A | 7/1994 | Montgomery | |
| 5,334,974 A | 8/1994 | Simms et al. | |
| 5,335,265 A | 8/1994 | Cooper et al. | |
| 5,343,493 A | 8/1994 | Karimullah | |
| 5,345,231 A | 9/1994 | Koo et al. | |

| | | | | | | |
|---|---|---|---|---|---|---|
| 5,345,595 A | 9/1994 | Johnson et al. | | 5,596,719 A | 1/1997 | Ramakrishnan et al. |
| 5,347,263 A | 9/1994 | Carroll et al. | | 5,602,843 A | 2/1997 | Gray |
| 5,354,974 A | 10/1994 | Eisenberg | | 5,604,414 A | 2/1997 | Milligan et al. |
| 5,355,278 A | 10/1994 | Hosoi et al. | | 5,604,869 A | 2/1997 | Mincher et al. |
| 5,355,513 A | 10/1994 | Clarke et al. | | 5,606,361 A | 2/1997 | Davidsohn et al. |
| 5,365,217 A | 11/1994 | Toner | | 5,608,786 A | 3/1997 | Gordon |
| 5,371,736 A | 12/1994 | Evan | | 5,613,620 A | 3/1997 | Center et al. |
| 5,382,778 A | 1/1995 | Takahira et al. | | 5,615,277 A | 3/1997 | Hoffman |
| 5,383,134 A | 1/1995 | Wrzesinski | | 5,619,192 A | 4/1997 | Ayala |
| 5,406,619 A | 4/1995 | Akhteruzzaman et al. | | 5,625,410 A | 4/1997 | Washino et al. |
| 5,412,192 A | 5/1995 | Hoss | | 5,628,050 A | 5/1997 | McGraw et al. |
| 5,412,760 A | 5/1995 | Peitz | | 5,629,687 A * | 5/1997 | Sutton et al. ............... 379/106 |
| 5,416,475 A | 5/1995 | Tolbert et al. | | 5,629,875 A | 5/1997 | Adair, Jr. |
| 5,416,725 A | 5/1995 | Pacheco et al. | | 5,630,209 A | 5/1997 | Wizgall et al. |
| 5,418,812 A | 5/1995 | Reyes et al. | | 5,631,554 A | 5/1997 | Briese et al. |
| 5,420,910 A | 5/1995 | Rudokas et al. | | 5,636,216 A | 6/1997 | Fox et al. |
| 5,424,708 A | 6/1995 | Ballesty et al. | | 5,644,294 A | 7/1997 | Ness |
| 5,432,507 A | 7/1995 | Mussino et al. | | 5,655,219 A | 8/1997 | Jusa et al. |
| 5,438,329 A | 8/1995 | Gastouniotis et al. | | 5,657,389 A | 8/1997 | Houvener |
| 5,439,414 A | 8/1995 | Jacob | | 5,659,300 A | 8/1997 | Dresselhuys et al. |
| 5,442,553 A | 8/1995 | Parrillo | | 5,659,303 A | 8/1997 | Adair, Jr. |
| 5,445,287 A | 8/1995 | Center et al. | | 5,668,876 A | 9/1997 | Falk et al. |
| 5,451,929 A | 9/1995 | Adelman et al. | | 5,673,252 A | 9/1997 | Johnson et al. |
| 5,451,938 A | 9/1995 | Brennan, Jr. | | 5,673,304 A | 9/1997 | Connor et al. |
| 5,452,344 A | 9/1995 | Larson | | 5,673,305 A | 9/1997 | Ross |
| 5,454,024 A * | 9/1995 | Lebowitz .................... 379/40 | | 5,682,139 A | 10/1997 | Pradeep et al. |
| 5,465,401 A | 11/1995 | Thompson | | 5,682,476 A | 10/1997 | Tapperson et al. |
| 5,467,074 A | 11/1995 | Pedtke | | 5,689,229 A | 11/1997 | Chaco et al. |
| 5,467,082 A | 11/1995 | Sanderson | | 5,699,328 A | 12/1997 | Ishizaki et al. |
| 5,467,345 A | 11/1995 | Cutler et al. | | 5,701,002 A | 12/1997 | Oishi et al. |
| 5,468,948 A | 11/1995 | Koenck et al. | | 5,704,046 A | 12/1997 | Hogan |
| 5,471,201 A | 11/1995 | Cerami et al. | | 5,704,517 A | 1/1998 | Lancaster, Jr. |
| 5,473,322 A | 12/1995 | Carney | | 5,706,191 A | 1/1998 | Bassett et al. |
| 5,475,689 A | 12/1995 | Kay et al. | | 5,706,976 A | 1/1998 | Purkey |
| 5,481,259 A | 1/1996 | Bane | | 5,708,223 A | 1/1998 | Wyss |
| 5,481,532 A | 1/1996 | Hassan et al. | | 5,708,655 A | 1/1998 | Toth |
| 5,484,997 A | 1/1996 | Haynes | | 5,712,619 A | 1/1998 | Simkin |
| 5,488,608 A | 1/1996 | Flammer, III | | 5,712,980 A | 1/1998 | Beeler et al. |
| 5,493,273 A | 2/1996 | Smurlo et al. | | 5,714,931 A * | 2/1998 | Petite et al. ............... 340/539 |
| 5,493,287 A | 2/1996 | Bane | | 5,717,718 A | 2/1998 | Rowsell et al. |
| 5,506,837 A | 4/1996 | Sollner et al. | | 5,726,634 A | 3/1998 | Hess et al. |
| 5,509,073 A | 4/1996 | Monnin | | 5,726,984 A | 3/1998 | Kubler et al. |
| 5,513,244 A | 4/1996 | Joao et al. | | 5,732,074 A | 3/1998 | Spaur et al. |
| 5,515,419 A | 5/1996 | Sheffer | | 5,732,078 A | 3/1998 | Arango |
| 5,517,188 A | 5/1996 | Carroll et al. | | 5,736,965 A | 4/1998 | Mosebrook et al. |
| 5,522,089 A | 5/1996 | Kikinis et al. | | 5,740,232 A | 4/1998 | Pailles et al. |
| 5,528,215 A | 6/1996 | Siu et al. | | 5,742,509 A | 4/1998 | Goldberg et al. |
| 5,539,825 A | 7/1996 | Akiyama et al. | | 5,745,849 A | 4/1998 | Britton |
| 5,541,938 A | 7/1996 | Di Zenzo et al. | | 5,748,104 A * | 5/1998 | Argyroudis et al. ......... 379/106 |
| 5,542,100 A | 7/1996 | Hatakeyama | | 5,748,619 A | 5/1998 | Meier |
| 5,544,036 A | 8/1996 | Brown, Jr. et al. | | 5,754,111 A | 5/1998 | Garcia |
| 5,544,784 A | 8/1996 | Malaspina | | 5,754,227 A | 5/1998 | Fukuoka |
| 5,548,632 A | 8/1996 | Walsh et al. | | 5,757,783 A | 5/1998 | Eng et al. |
| 5,550,358 A | 8/1996 | Tait et al. | | 5,757,788 A | 5/1998 | Tatsumi et al. |
| 5,550,359 A | 8/1996 | Bennett | | 5,761,083 A * | 6/1998 | Brown, Jr. et al. ..... 340/825.06 |
| 5,550,535 A | 8/1996 | Park | | 5,764,742 A | 6/1998 | Howard et al. |
| 5,553,094 A | 9/1996 | Johnson et al. | | 5,767,791 A | 6/1998 | Stoop et al. |
| 5,555,258 A | 9/1996 | Snelling et al. | | 5,771,274 A | 6/1998 | Harris |
| 5,555,286 A | 9/1996 | Tendler | | 5,774,052 A | 6/1998 | Hamm et al. |
| 5,562,537 A | 10/1996 | Zver et al. | | 5,781,143 A | 7/1998 | Rossin |
| 5,565,857 A | 10/1996 | Lee | | 5,790,644 A | 8/1998 | Kikinis |
| 5,568,535 A * | 10/1996 | Sheffer et al. ............... 379/39 | | 5,790,662 A | 8/1998 | Valerij et al. |
| 5,570,084 A | 10/1996 | Ritter et al. | | 5,790,938 A | 8/1998 | Talarmo |
| 5,572,438 A | 11/1996 | Ehlers et al. | | 5,796,727 A | 8/1998 | Harrison et al. |
| 5,573,181 A | 11/1996 | Ahmed | | 5,798,964 A | 8/1998 | Shimizu et al. |
| 5,574,111 A | 11/1996 | Brichta et al. | | 5,801,643 A | 9/1998 | Williams et al. |
| 5,583,850 A | 12/1996 | Snodgrass et al. | | 5,815,505 A | 9/1998 | Mills |
| 5,587,705 A | 12/1996 | Morris | | 5,818,822 A | 10/1998 | Thomas et al. |
| 5,589,878 A | 12/1996 | Cortjens et al. | | 5,822,273 A | 10/1998 | Bary et al. |
| 5,590,038 A | 12/1996 | Pitroda | | 5,822,544 A | 10/1998 | Chaco et al. |
| 5,590,179 A | 12/1996 | Shincovich et al. | | 5,825,772 A | 10/1998 | Dobbins et al. |
| 5,592,491 A | 1/1997 | Dinks | | 5,826,195 A | 10/1998 | Westerlage et al. |
| 5,594,431 A | 1/1997 | Sheppard et al. | | 5,828,044 A | 10/1998 | Jun et al. |

| Patent Number | Date | Inventor |
|---|---|---|
| 5,832,057 A | 11/1998 | Furman |
| 5,838,223 A | 11/1998 | Gallant et al. |
| 5,838,237 A | 11/1998 | Revell et al. |
| 5,838,812 A | 11/1998 | Pare, Jr. et al. |
| 5,841,118 A | 11/1998 | East et al. |
| 5,841,764 A | 11/1998 | Roderique et al. |
| 5,842,976 A | 12/1998 | Williamson |
| 5,844,808 A | 12/1998 | Konsmo et al. |
| 5,845,230 A | 12/1998 | Lamberson |
| 5,852,658 A | 12/1998 | Knight et al. |
| 5,854,994 A | 12/1998 | Canada et al. |
| 5,862,201 A | 1/1999 | Sands |
| 5,864,772 A | 1/1999 | Alvarado et al. |
| 5,873,043 A | 2/1999 | Comer |
| 5,874,903 A | 2/1999 | Shuey et al. |
| 5,880,677 A | 3/1999 | Lestician |
| 5,884,184 A | 3/1999 | Sheffer |
| 5,884,271 A | 3/1999 | Pitroda |
| 5,886,333 A | 3/1999 | Miyake |
| 5,889,468 A | 3/1999 | Banga |
| 5,892,690 A | 4/1999 | Boatman et al. |
| 5,892,758 A | 4/1999 | Argyroudis |
| 5,892,924 A | 4/1999 | Lyon et al. |
| 5,896,097 A | 4/1999 | Cardozo |
| 5,897,607 A | 4/1999 | Jenney et al. |
| 5,898,369 A | 4/1999 | Godwin |
| 5,905,438 A | 5/1999 | Weiss et al. |
| 5,907,291 A | 5/1999 | Chen et al. |
| 5,907,491 A | 5/1999 | Canada et al. |
| 5,907,540 A | 5/1999 | Hayashi |
| 5,907,807 A | 5/1999 | Chavez, Jr. et al. |
| 5,914,672 A | 6/1999 | Glorioso et al. |
| 5,914,673 A | 6/1999 | Jennings et al. |
| 5,917,405 A | 6/1999 | Joao |
| 5,917,629 A | 6/1999 | Hortensius et al. |
| 5,923,269 A | 7/1999 | Shuey et al. |
| 5,926,103 A | 7/1999 | Petite |
| 5,926,529 A | 7/1999 | Hache et al. |
| 5,926,531 A | 7/1999 | Petite |
| 5,933,073 A | 8/1999 | Shuey |
| 5,941,363 A | 8/1999 | Partyka et al. |
| 5,941,955 A | 8/1999 | Wilby et al. |
| 5,948,040 A | 9/1999 | DeLorme et al. |
| 5,949,779 A | 9/1999 | Mostafa et al. |
| 5,949,799 A | 9/1999 | Grivna et al. |
| 5,953,319 A | 9/1999 | Dutta et al. |
| 5,953,371 A | 9/1999 | Rowsell et al. |
| 5,955,718 A | 9/1999 | Levasseur et al. |
| 5,960,074 A | 9/1999 | Clark |
| 5,963,146 A | 10/1999 | Johnson et al. |
| 5,963,452 A | 10/1999 | Etoh et al. |
| 5,963,650 A | 10/1999 | Simionescu et al. |
| 5,966,658 A | 10/1999 | Kennedy, III et al. |
| 5,969,608 A | 10/1999 | Sojdehei et al. |
| 5,973,756 A | 10/1999 | Erlin |
| 5,974,236 A | 10/1999 | Sherman |
| 5,978,364 A | 11/1999 | Melnik |
| 5,978,371 A | 11/1999 | Mason, Jr. et al. |
| 5,986,574 A | 11/1999 | Colton |
| 5,987,421 A | 11/1999 | Chuang |
| 5,991,625 A | 11/1999 | Vanderpool |
| 5,991,639 A | 11/1999 | Rautiola et al. |
| 5,994,892 A * | 11/1999 | Turino et al. ............... 324/142 |
| 5,995,592 A | 11/1999 | Shirai et al. |
| 5,995,593 A | 11/1999 | Cho |
| 5,997,170 A | 12/1999 | Brodbeck |
| 5,999,094 A | 12/1999 | Nilssen |
| 6,005,759 A | 12/1999 | Hart et al. |
| 6,005,963 A | 12/1999 | Bolle et al. |
| 6,021,664 A | 2/2000 | Granato et al. |
| 6,023,223 A | 2/2000 | Baxter, Jr. |
| 6,028,522 A | 2/2000 | Petite |
| 6,028,857 A | 2/2000 | Poor |
| 6,031,455 A | 2/2000 | Grube et al. |
| 6,032,197 A | 2/2000 | Birdwell et al. |
| 6,035,213 A | 3/2000 | Tokuda et al. |
| 6,035,266 A | 3/2000 | Williams et al. |
| 6,036,086 A | 3/2000 | Sizer, II et al. |
| 6,038,491 A | 3/2000 | McGarry et al. |
| 6,044,062 A | 3/2000 | Brownrigg et al. |
| 6,054,920 A | 4/2000 | Smith et al. |
| 6,060,994 A | 5/2000 | Chen |
| 6,061,604 A | 5/2000 | Russ et al. |
| 6,064,318 A | 5/2000 | Kirchner, III et al. |
| 6,067,017 A | 5/2000 | Stewart et al. |
| 6,067,030 A | 5/2000 | Burnett et al. |
| 6,069,886 A | 5/2000 | Ayerst et al. |
| 6,073,169 A | 6/2000 | Shuey et al. |
| 6,073,266 A | 6/2000 | Ahmed et al. |
| 6,073,840 A | 6/2000 | Marion |
| 6,075,451 A | 6/2000 | Lebowitz et al. |
| 6,087,957 A | 7/2000 | Gray |
| 6,088,659 A | 7/2000 | Kelley et al. |
| 6,094,622 A | 7/2000 | Hubbard et al. |
| 6,100,817 A | 8/2000 | Mason, Jr. et al. |
| 6,101,427 A | 8/2000 | Yang |
| 6,101,445 A | 8/2000 | Alvarado et al. |
| 6,112,983 A | 9/2000 | D'Anniballe et al. |
| 6,115,580 A | 9/2000 | Chuprun et al. |
| 6,119,076 A | 9/2000 | Williams et al. |
| 6,121,593 A | 9/2000 | Mansbery et al. |
| 6,121,885 A | 9/2000 | Masone et al. |
| 6,124,806 A | 9/2000 | Cunningham et al. |
| 6,127,917 A | 10/2000 | Tuttle |
| 6,128,551 A | 10/2000 | Davis et al. |
| 6,130,622 A | 10/2000 | Hussey et al. |
| 6,133,850 A | 10/2000 | Moore |
| 6,137,423 A | 10/2000 | Glorioso et al. |
| 6,140,975 A | 10/2000 | Cohen |
| 6,141,347 A | 10/2000 | Shaughnessy et al. |
| 6,150,936 A | 11/2000 | Addy |
| 6,150,955 A | 11/2000 | Tracy et al. |
| 6,157,464 A | 12/2000 | Bloomfield et al. |
| 6,157,824 A | 12/2000 | Bailey |
| 6,163,276 A | 12/2000 | Irving et al. |
| 6,172,616 B1 | 1/2001 | Johnson et al. |
| 6,174,205 B1 | 1/2001 | Madsen et al. |
| 6,175,922 B1 | 1/2001 | Wang |
| 6,177,883 B1 | 1/2001 | Jennetti et al. |
| 6,181,255 B1 | 1/2001 | Crimmins et al. |
| 6,181,284 B1 | 1/2001 | Madsen et al. |
| 6,181,981 B1 | 1/2001 | Varga et al. |
| 6,188,354 B1 | 2/2001 | Soliman et al. |
| 6,192,390 B1 | 2/2001 | Berger et al. |
| 6,198,390 B1 | 3/2001 | Schlager et al. |
| 6,199,068 B1 | 3/2001 | Carpenter |
| 6,208,266 B1 | 3/2001 | Lyons et al. |
| 6,215,440 B1 | 4/2001 | Morales |
| 6,218,953 B1 | 4/2001 | Petite |
| 6,218,983 B1 | 4/2001 | Kerry et al. |
| 6,219,409 B1 | 4/2001 | Smith et al. |
| 6,229,439 B1 | 5/2001 | Tice |
| 6,233,327 B1 | 5/2001 | Petite |
| 6,234,111 B1 | 5/2001 | Ulman et al. |
| 6,236,332 B1 | 5/2001 | Conkright et al. |
| 6,243,010 B1 | 6/2001 | Addy et al. |
| 6,246,677 B1 | 6/2001 | Nap et al. |
| 6,246,886 B1 | 6/2001 | Oliva |
| 6,249,516 B1 | 6/2001 | Brownrigg et al. |
| 6,259,369 B1 | 7/2001 | Monico |
| 6,286,756 B1 | 9/2001 | Stinson et al. |
| 6,288,634 B1 | 9/2001 | Weiss et al. |
| 6,288,641 B1 | 9/2001 | Carsais |
| 6,295,291 B1 | 9/2001 | Larkins |
| 6,301,514 B1 | 10/2001 | Canada et al. |
| 6,304,556 B1 | 10/2001 | Haas |

| | | |
|---|---|---|
| 6,305,602 B1 | 10/2001 | Grabowski et al. |
| 6,308,111 B1 | 10/2001 | Koga |
| 6,311,167 B1 | 10/2001 | Davis et al. |
| 6,314,169 B1 | 11/2001 | Schelberg, Jr. et al. |
| 6,317,029 B1 | 11/2001 | Fleeter |
| 6,334,117 B1 | 12/2001 | Covert et al. |
| 6,351,223 B1 | 2/2002 | DeWeerd et al. |
| 6,356,205 B1 | 3/2002 | Salvo et al. |
| 6,357,034 B1 | 3/2002 | Muller et al. |
| 6,362,745 B1 | 3/2002 | Davis |
| 6,363,057 B1 | 3/2002 | Ardalan et al. |
| 6,366,217 B1 | 4/2002 | Cunningham et al. |
| 6,369,769 B1 | 4/2002 | Nap et al. |
| 6,370,489 B1 | 4/2002 | Williams et al. |
| 6,373,399 B1 | 4/2002 | Johnson et al. |
| 6,380,851 B1 | 4/2002 | Gilbert et al. |
| 6,384,722 B1 | 5/2002 | Williams |
| 6,393,341 B1 | 5/2002 | Lawrence et al. |
| 6,393,381 B1 | 5/2002 | Williams et al. |
| 6,393,382 B1 | 5/2002 | Williams et al. |
| 6,396,839 B1 | 5/2002 | Ardalan et al. |
| 6,400,819 B1 | 6/2002 | Nakano et al. |
| 6,401,081 B1 | 6/2002 | Montgomery et al. |
| 6,411,889 B1 | 6/2002 | Mizunuma et al. |
| 6,415,245 B2 | 7/2002 | Williams et al. |
| 6,421,354 B1 | 7/2002 | Godlewski |
| 6,421,731 B1 | 7/2002 | Ciotti, Jr. et al. |
| 6,422,464 B1 | 7/2002 | Terranova |
| 6,424,270 B1 | 7/2002 | Ali |
| 6,424,931 B1 | 7/2002 | Sigmar et al. |
| 6,430,268 B1 * | 8/2002 | Petite ............................ 379/39 |
| 6,431,439 B1 | 8/2002 | Suer et al. |
| 6,437,692 B1 | 8/2002 | Petite et al. |
| 6,438,575 B1 | 8/2002 | Khan et al. |
| 6,445,291 B2 | 9/2002 | Addy et al. |
| 6,456,960 B1 | 9/2002 | Williams et al. |
| 6,457,038 B1 | 9/2002 | Defosse |
| 6,462,644 B1 | 10/2002 | Howell et al. |
| 6,462,672 B1 | 10/2002 | Besson |
| 6,477,558 B1 | 11/2002 | Irving et al. |
| 6,483,290 B1 | 11/2002 | Hemminger et al. |
| 6,484,939 B1 | 11/2002 | Blaeuer |
| 6,489,884 B1 | 12/2002 | Lamberson et al. |
| 6,491,828 B1 | 12/2002 | Sivavec et al. |
| 6,492,910 B1 | 12/2002 | Ragle et al. |
| 6,504,357 B1 | 1/2003 | Hemminger et al. |
| 6,507,794 B1 | 1/2003 | Hubbard et al. |
| 6,509,722 B2 | 1/2003 | Lopata |
| 6,519,568 B1 | 2/2003 | Harvey et al. |
| 6,538,577 B1 | 3/2003 | Ehrke et al. |
| 6,542,076 B1 | 4/2003 | Joao |
| 6,542,077 B2 | 4/2003 | Joao |
| 6,543,690 B2 | 4/2003 | Leydier et al. |
| 6,560,223 B1 | 5/2003 | Egan et al. |
| 6,574,603 B1 | 6/2003 | Dickson et al. |
| 6,584,080 B1 | 6/2003 | Ganz et al. |
| 6,600,726 B1 | 7/2003 | Nevo et al. |
| 6,608,551 B1 | 8/2003 | Anderson et al. |
| 6,618,578 B1 | 9/2003 | Petite |
| 6,618,709 B1 | 9/2003 | Sneeringer |
| 6,628,764 B1 | 9/2003 | Petite |
| 6,628,965 B1 | 9/2003 | LaRosa et al. |
| 6,653,945 B2 | 11/2003 | Johnson et al. |
| 6,671,586 B2 | 12/2003 | Davis et al. |
| 6,674,403 B2 | 1/2004 | Gray et al. |
| 6,678,255 B1 | 1/2004 | Kuriyan |
| 6,678,285 B1 | 1/2004 | Garg |
| 6,731,201 B1 | 5/2004 | Bailey et al. |
| 6,735,630 B1 | 5/2004 | Gelvin et al. |
| 6,747,557 B1 | 6/2004 | Petite et al. |
| 6,771,981 B1 | 8/2004 | Zalewski et al. |
| 6,804,532 B1 | 10/2004 | Moon et al. |
| 6,891,838 B1 | 5/2005 | Petite |
| 6,914,533 B2 | 7/2005 | Petite |
| 6,914,893 B2 | 7/2005 | Petite |
| 6,959,550 B2 | 11/2005 | Freeman et al. |
| 7,054,271 B2 | 5/2006 | Brownrigg et al. |
| 2001/0003479 A1 | 6/2001 | Fujiwara |
| 2001/0021646 A1 | 9/2001 | Antonucci et al. |
| 2001/0024163 A1 | 9/2001 | Petite |
| 2001/0034223 A1 | 10/2001 | Rieser et al. |
| 2001/0038343 A1 | 11/2001 | Meyer et al. |
| 2002/0002444 A1 | 1/2002 | Williams et al. |
| 2002/0013679 A1 | 1/2002 | Petite |
| 2002/1112323 | 1/2002 | Petite |
| 2002/0019725 A1 | 2/2002 | Petite |
| 2002/0027504 A1 | 3/2002 | Petite |
| 2002/0031101 A1 | 3/2002 | Petite |
| 2002/0032746 A1 | 3/2002 | Lazaridis |
| 2002/0061031 A1 | 5/2002 | Sugar et al. |
| 2002/0072348 A1 | 6/2002 | Wheeler et al. |
| 2002/0089428 A1 | 7/2002 | Walden et al. |
| 2002/0095399 A1 | 7/2002 | Devine et al. |
| 2002/0098858 A1 | 7/2002 | Struhsaker |
| 2002/0109607 A1 | 8/2002 | Cumeralto et al. |
| 2002/0136233 A1 | 9/2002 | Chen et al. |
| 2002/0158774 A1 | 10/2002 | Johnson et al. |
| 2002/0163442 A1 | 11/2002 | Fischer |
| 2002/0169643 A1 | 11/2002 | Petite |
| 2002/0193144 A1 | 12/2002 | Belski et al. |
| 2003/0001754 A1 | 1/2003 | Johnson et al. |
| 2003/0028632 A1 | 2/2003 | Davis |
| 2003/0030926 A1 | 2/2003 | Aguren et al. |
| 2003/0034900 A1 | 2/2003 | Han |
| 2003/0036822 A1 | 2/2003 | Davis et al. |
| 2003/0046377 A1 | 3/2003 | Daum et al. |
| 2003/0058818 A1 | 3/2003 | Wilkes et al. |
| 2003/0069002 A1 | 4/2003 | Hunter et al. |
| 2003/0078029 A1 | 4/2003 | Petite |
| 2003/0093484 A1 | 5/2003 | Petite |
| 2003/0133473 A1 | 7/2003 | Manis et al. |
| 2003/0169710 A1 | 9/2003 | Fan et al. |
| 2003/0185204 A1 | 10/2003 | Murdock |
| 2003/0210638 A1 | 11/2003 | Yoo |
| 2004/0047324 A1 | 3/2004 | Diener |
| 2004/0053639 A1 | 3/2004 | Petite |
| 2004/0131125 A1 | 7/2004 | Sanderford, Jr. et al. |
| 2004/0183687 A1 | 9/2004 | Petite |
| 2004/0228330 A1 | 11/2004 | Kubler et al. |
| 2005/0190055 A1 | 9/2005 | Petite |
| 2005/0195768 A1 | 9/2005 | Petite |
| 2005/0195775 A1 | 9/2005 | Petite |
| 2005/0201397 A1 | 9/2005 | Petite |
| 2005/0243867 A1 | 11/2005 | Petite |
| 2006/0095876 A1 | 5/2006 | Brownrigg et al. |

FOREIGN PATENT DOCUMENTS

| | | |
|---|---|---|
| EP | 07144 | 2/1998 |
| EP | 1096454 | 5/2001 |
| FR | 2817110 | 5/2002 |
| GB | 2229302 | 9/1990 |
| GB | 2247761 | 3/1992 |
| GB | 2262683 | 6/1993 |
| GB | 2297663 | 8/1996 |
| GB | 2310779 | 9/1997 |
| GB | 2326002 | 12/1998 |
| GB | 2336272 | 10/1999 |
| GB | 2352004 | 1/2001 |
| GB | 2352590 | 1/2001 |
| JP | 60261288 | 12/1985 |
| JP | 01255100 | 10/1989 |
| JP | 11353573 | 12/1999 |
| JP | 200113590 | 4/2000 |
| JP | 2001063425 | 3/2001 |

| | | |
|---|---|---|
| JP | 2001088401 | 4/2001 |
| JP | 2001309069 | 11/2001 |
| JP | 2001319284 | 11/2001 |
| JP | 2001357483 | 12/2001 |
| JP | 2002007672 | 1/2002 |
| JP | 2002007826 | 1/2002 |
| JP | 2002085354 | 3/2002 |
| JP | 2002171354 | 6/2002 |
| KR | 2001025431 | 4/2001 |
| NO | 03/021877 | 3/2003 |
| WO | WO 90/13197 | 11/1990 |
| WO | 9524177 | 9/1995 |
| WO | WO 98/00056 | 1/1998 |
| WO | WO 98/37528 | 8/1998 |
| WO | WO 99/13426 | 3/1999 |
| WO | 0023956 | 4/2000 |
| WO | WO 01/15114 | 8/2000 |
| WO | WO 01/24109 | 4/2001 |
| WO | WO 02/08725 | 1/2002 |
| WO | WO 02/08866 | 1/2002 |
| WO | WO02/052521 | 7/2002 |
| WO | WO 02/052521 | 7/2002 |
| WO | WO03/007264 | 1/2003 |
| WO | WO 03/007264 | 1/2003 |
| WO | WO 03/021877 | 3/2003 |
| WO | 0402014 | 12/2003 |

OTHER PUBLICATIONS

Khan, Robert E., "The Organization of Computer Resources into a Packet Radio Network," IEEE, Jan. 1977, vol. Com-25 No. 1, pp. 169-178.

Westcott, Jill A., "Issues in Distributed Routing for Mobile Packet Radio Network," IEEE 1982, pp. 233-238.

Khan, Robert E., "The Organization of Computer Resources into a Packet Radio Network," IEEE Transactions on Communications, Jan. 1977, vol. Com-25 No. 1, pp. 169-178.

Westcott, Jill A., "Issues in Distributed Routing for Mobile Packet Radio Network," IEEE 1982, pp. 233-238.

Westcott, Jil et al., "A Distributed Routing Design For A Broadcoast Environment", IEEE 1982, pp. 10.4.0-10.4.5.

Khan, Robert E. et al., "Advances in Packet Radio Technology", IEEE Nov. 1978, vol. 66, No. 11, pp. 1468-1496.

Frankel, Michael S., "Packet Radios Provide Link for Distributed, Survivable C3 in Post-Attack Scenarios", MSN Jun. 1983.

Lauer, Greg et al., "Survivable Protocols for Large Scale Packet Radio Networks", IEEE 1984, pp. 15.1-1 to 15.1-4.

Gower, Neil et al., "Congestion Control Using Pacing in a Packet Radio Network", IEEE 1982, pp. 23.1-1 to 23.1-6.

MacGregor, William et al., "Multiple Control Stations in Packet Radio Networks", IEEE 1982, pp. 10.3-1 to 10.3-5.

Shacham, Nachum et al., "Future Directions in Packet Radio Technology", IEEE 1985, pp. 93-98.

Jubin, John, "Current Packet Radio Network Protocols", IEEE 1985, pp. 86-92.

Westcott, Jill A., Issues in Distributed Routing for Mobile Packet Radio Network, IEEE 1982, pp. 233-238.

Lynch, Clifford A. et al., Packet Radio Networks, "Architectures, Protocols, Technologies and Applications," no date.

Brownrigg, E.B. et al.; A Packet Radio Network for Library Automation; IEEE (1987); pp. 456-462.

Brownrigg, E.B. et al.; A Packet Radio Networks; Architectures, Protocols, Technologies and Applications (1987), (introduction pp. ix-xviii); pp. 3-274.

Brownrigg, E.B. et al.; Distributions, Networks, and Networking; Operations for Dissemination; Workshop on Electronic Texts Session III (http://palimpsest.standford.edu/byorg/lc/etextw/sess3.html 1992): pp. 1-10.

Brownrigg, E.B. et al.; User Provided Access to the Internet; (http://web.simmons.edu/~chen/nit/NIT'92/033-bro.htm2005) pp. 1-6.

Wey, Jyhi-Kong et al.; Clone Terminator: An Authentication Service for Advanced Mobile Phone System; IEEE (1995); pp. 175-179.

Davis, A.B. et al.; Knowledge-Based Management of Cellular Clone Fraud; IEEE (1992); pp. 230-234.

Johnson, David B.; Routing in Ad Hoc Networks of Mobile Hosts; IEEE (1995); pp. 158-163.

Jubin, John and Tornow, Janet D., "The Darpa Packet Radio Network Protocols,"Proceedings of the IEEE, vol. 75, No. 1, Jan. 1987, pp. 21-32.

Kleinrock, Leonard and Kamoun, Farouk, "Hierarchical Routing for Large Networks," North-Holland Publishing Company, Computer Networks 1, 1997, pp. 155-174.

Perkins, C.E. et al.; Highly Dynamic Destination-Sequenced Distance-Vector Routing (DSDV) for Mobil Computer; SIGCOMM 94-9/94 London England UK (1994); pp. 234-244.

Wu, J. Distributed System Design; CRC Press (1999); pp. 177-180 and 204.

Khan, Robert E. Gronemeyer, Steven A. Burchfiel, Jerry, and Kunzelman, Ronald C., "Advances in Packet Radio Technology" IEEE Nov. 1978, vol. 66, No. 11, pp. 1468-149.

* cited by examiner

| Instruction Code | Function |
|---|---|
| 00000001 | Vending machine n is low on product X |
| 00000002 | Vending machine n is out of product X |
| 00000003 | Vending machine n is out of product Y |
| 00000004 | Vending machine n is out of order |
| 00000005 | Vending machine n is tilted |
| ... | ... |
| 00100101 | Person Y is in distress. |
| ... | ... |
| 00111101 | Trash Compactor m is in need of service. |
| ... | ... |
| 10011001 | Gas pump k is low on fuel. |

MULTI-FUNCTION GENERAL PURPOSE TRANSCEIVER

CROSS-REFERENCE TO RELATED APPLICATIONS

This application is a continuation of U.S. application Ser. No. 09/102,399 filed Jun. 22, 1998 now U.S. Pat. No. 6,233,327 which is a continuation-in-part of U.S. patent applications Ser. Nos. 08/825,576, filed on Mar. 31, 1997, entitled Transmitter for Accessing Automated Financial Transaction Machines, 08/895,720, filed Jul. 17, 1997 now U.S. Pat. No. 5,926,531, entitled Transmitter for Accessing Pay-Type Telephones, and 08/910,980, filed Aug. 7, 1997, entitled Transmitter for Automatically Communicating Information to a Telephone, which all claimed the benefit of U.S. provisional patent application Ser. No. 60/040,316, filed Feb. 14, 1997, and entitled Card Replacement Transceiver for Use With Automatic Teller Machines This application further claims the benefit of U.S. provisional patent application Ser No. 60/059,643, filed Sep. 20, 1997, and entitled System For Requesting Service Of A Vending Machine.

BACKGROUND OF THE INVENTION

The present invention generally relates to transceivers, and more particularly to a general purpose radio frequency (RF) transceiver having an open-ended architecture that readily adapts it for a wide variety of uses and applications.

There are a wide variety of circumstances in which it is desired or desirable to communicate information to a single location. For example, in the banking industry, when a user accesses an automated teller machine (ATM), it may be desirable to communicate the user identifying information (e.g., account and PIN number) to a central location to verify that the PIN number matches the account number. Likewise, if the ATM breaks down, malfunctions, runs out of money, takes in a predetermined amount of money, or for a variety of other reasons, it may be desirable to communicate such information to a centralize location that can respond accordingly (e.g., dispatch a person to repair or otherwise service machine).

In the vending machine industry, it may be desirable to communicate information relating to the product status (e.g., low or out of stock) of a given vending machine to a central location, so that service personnel may be dispatched to replenish the product. In similar fashion, it may be desirable to communicate machine operational status to a centralized location for purposes of dispatching repair or service personnel. Thus, for example, if the vending machine malfunctions, runs out of change, acquires too much currency, or for other reasons, it may be desired to communicate this information to a centralized location One way this type of information has been communicated in the past has been to dispatch personnel to periodically check on such machinery If problems were noted, then the dispatched personnel communicated this information to a central dispatch or service location One shortcoming with this approach, however, is that it is relatively expensive to employ an individual to make these periodic status checks Also, a machine may be disabled or otherwise in need of service for a undesirably lengthy period of time between service checks, before the service condition is noted and reported.

Accordingly, it is desired to provide an apparatus that effectively addresses the these and other shortcomings of the prior art.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system for communicating information to a predetermined location. In accordance with one aspect of the invention, the system includes a transmitter disposed at a first location and configured to transmit a signal containing an instruction code to a transceiver The instruction code uniquely identifies an instruction to be carried out Preferably, the transmitter transmits a relatively low-power radio-frequency electromagnetic signal. The system further includes a transceiver disposed remotely from the transmitter (but within range of the transmitted signal) and is configured to receive the transmitted signal. The transceiver circuit includes a line interface circuit configured to interface with a telephone line that is part of the public-switched telephone network (PSTN) and initiate a phone call over the telephone line. In this regard, the transceiver further includes a controller configured to control both the reception of the transmitted signal and to control the communication of information over the telephone line. Finally, the system includes a central station remotely located from said transceiver but being in communication with said transceiver via the PSTN. The central station further includes a decoder configured to decode the instruction code.

As will be appreciated, the system summarized above provides an extremely robust and flexible platform for providing general purpose communications to a central location. In this regard, the term "general purpose" may also be referred to as an "open ended" platform that may be readily adapted for a wide variety of uses. The instruction code is a relatively small data value that may be decoded to define a wide variety of functions. For example, an instruction code a single byte (eight bits) in size may define up to two hundred fifty six different functions or instructions Similarly, an instruction code two bytes in size may define over sixty-five thousand ($2^{16}$) functions or instructions.

In operation, the transmitter transmits the instruction code, perhaps along with other information, to a transceiver located remotely, but generally nearby. The transceiver, which will preferably be integrated into a pay-type public telephone (but which can be integrated into virtually any telephone or other device having access to the PSTN), receives the transmitted information including the instruction code, and communicates this information to a predetermined location over the PSTN. In this regard, the transceiver is configured with a controller or other appropriate component to place a call to a predetermined phone number. Once the connection is established, the instruction code may be communicated (as by modem) to the predetermined location. The predetermined location (which may be a central dispatch location) then decodes the instruction code to identify the function or instruction that corresponds to the code, and further initiates an appropriate response.

To illustrate the foregoing summary with a more concrete example, consider a vending machine that is running low on a particular product. A sensor within the vending machine may make this determination and signal the transmitter accordingly. The transmitter then broadcasts a transmission that includes an instruction code that corresponds to the low product alert. The transceiver receives the broadcast transmission and communicates this information to a predetermined phone number. In this respect, the predetermined phone number may also be communicated from the transmitter to the transceiver along with the instruction code. Assuming that the predetermined number corresponds to a central dispatch center, the center answers the phone call placed by the transceiver and receives the instruction code. It then decodes the instruction code to determine that a particular product is low in the vending machine, and it may dispatch an appropriate service person to restock the machine. To this end, the center may be configured to generate an email message to route to an appropriate service person to handle the request.

In accordance with another aspect of the invention, a method is provided for performing an automated service request. In accordance with this aspect of the invention, the method includes the steps of sensing a service condition and notifying a transmitter of the service condition. Then the method transmits an information signal from the transmitter to a remotely-located transceiver, wherein the information signal includes a function code that specifies the service condition. Thereafter, the method places a call from the transceiver to a central station over a phone line comprising a part of the public switched telephone network (PSTN), and communicates at least the function code from the transceiver to the central station. Finally, the method decodes the function code at the central station to identify the service request.

In accordance with a broader aspect of the present invention a multi-function, general purpose transceiver is provided In accordance with this broad aspect of the invention, the transceiver includes a receiver circuit for receiving a signal transmitted from a remotely located transmitter. The transceiver also includes a transmitter that is configured to communicate information over a phone line, comprising a portion of the PSTN Finally, the transceiver includes a controller that is configured acquire information from the receiver circuit, initiate a phone call to a predetermined location, and transmit the acquired information over the PSTN to the called location

DESCRIPTION OF THE DRAWINGS

The accompanying drawings incorporated in and forming a part of the specification, illustrate several aspects of the present invention, and together with the description serve to explain the principles of the invention. In the drawings:

FIG. 5 is look-up table illustrating the association of instruction codes with there relevant function;

DETAILED DESCRIPTION OF THE PREFERRED EMBODIMENT

Figure 1A:
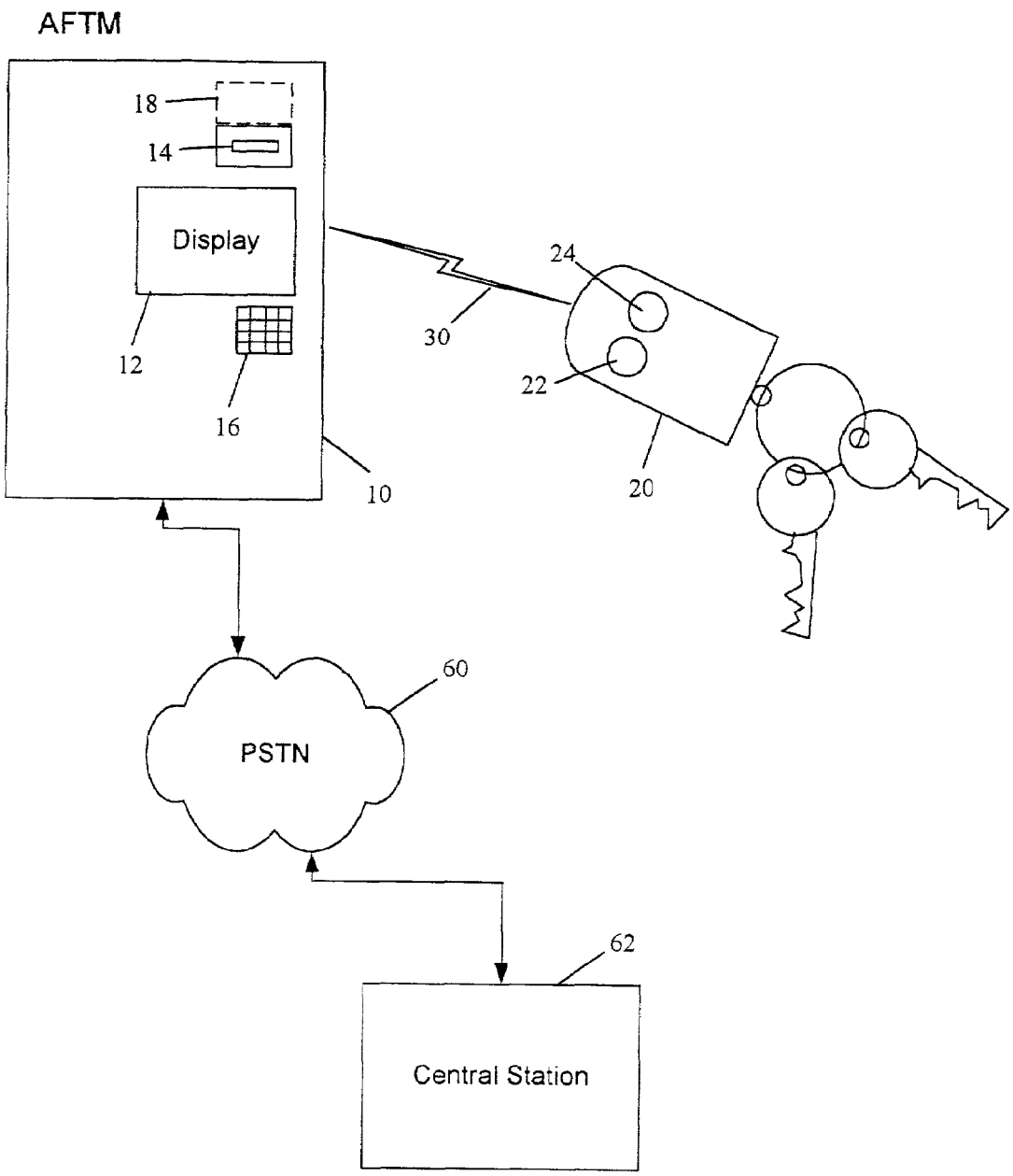
FIGS. 1A and 1B are block diagrams of a system constructed in accordance with one embodiment of the invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 1B:
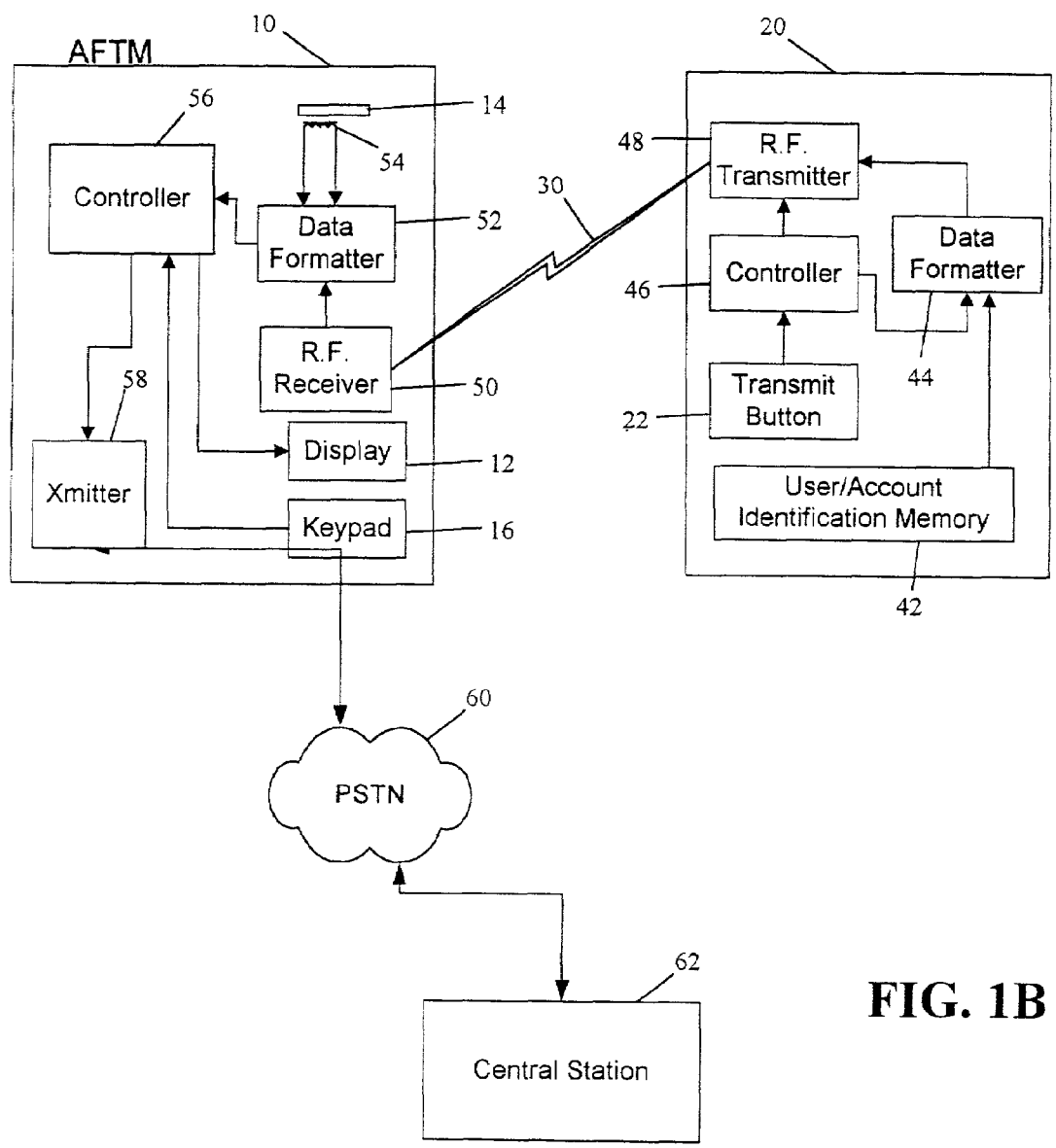
Figure 2A:
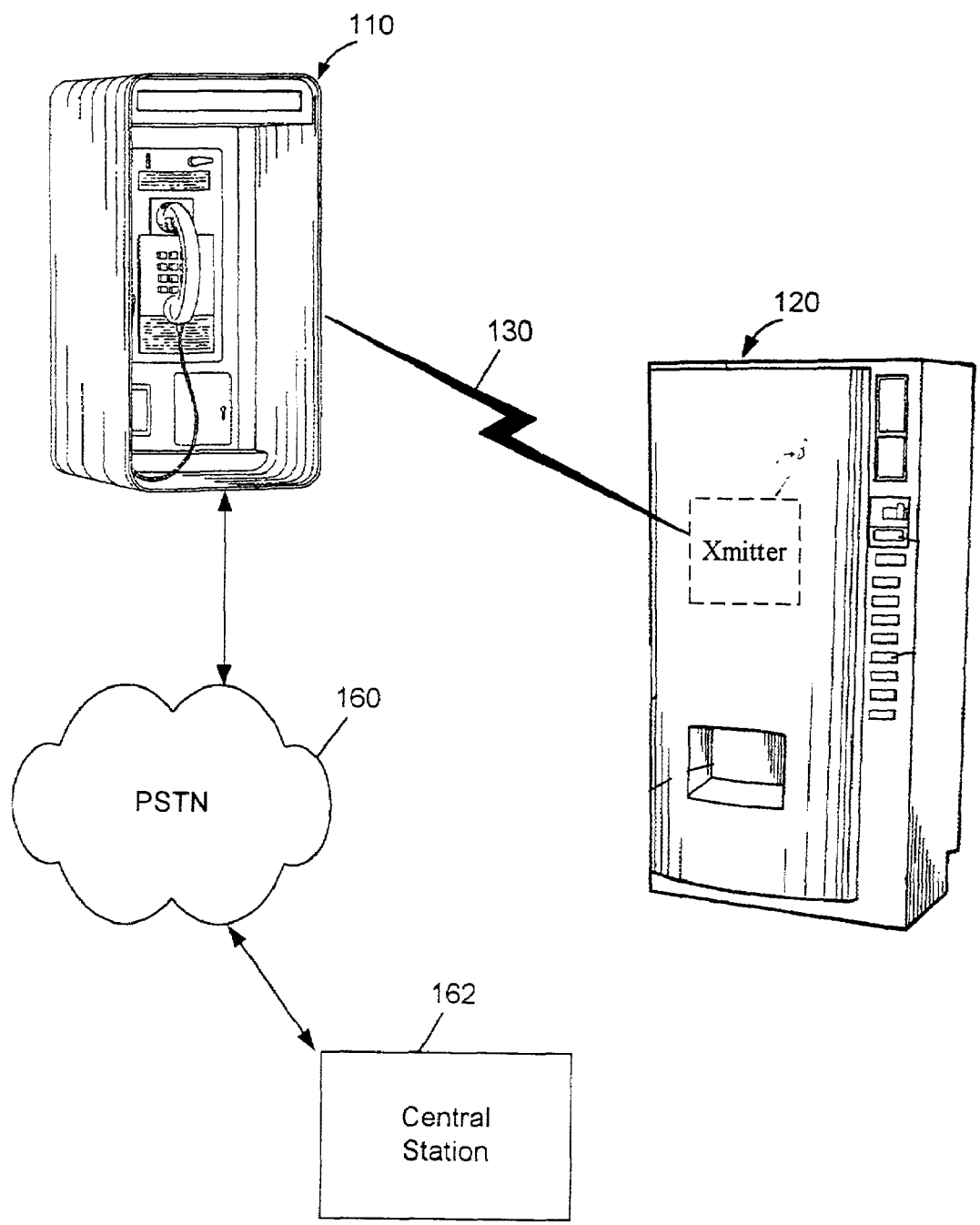
FIGS. 2A and 2B are block diagrams of a system constructed in accordance with an alternative embodiment of the invention.
Figure 2B:
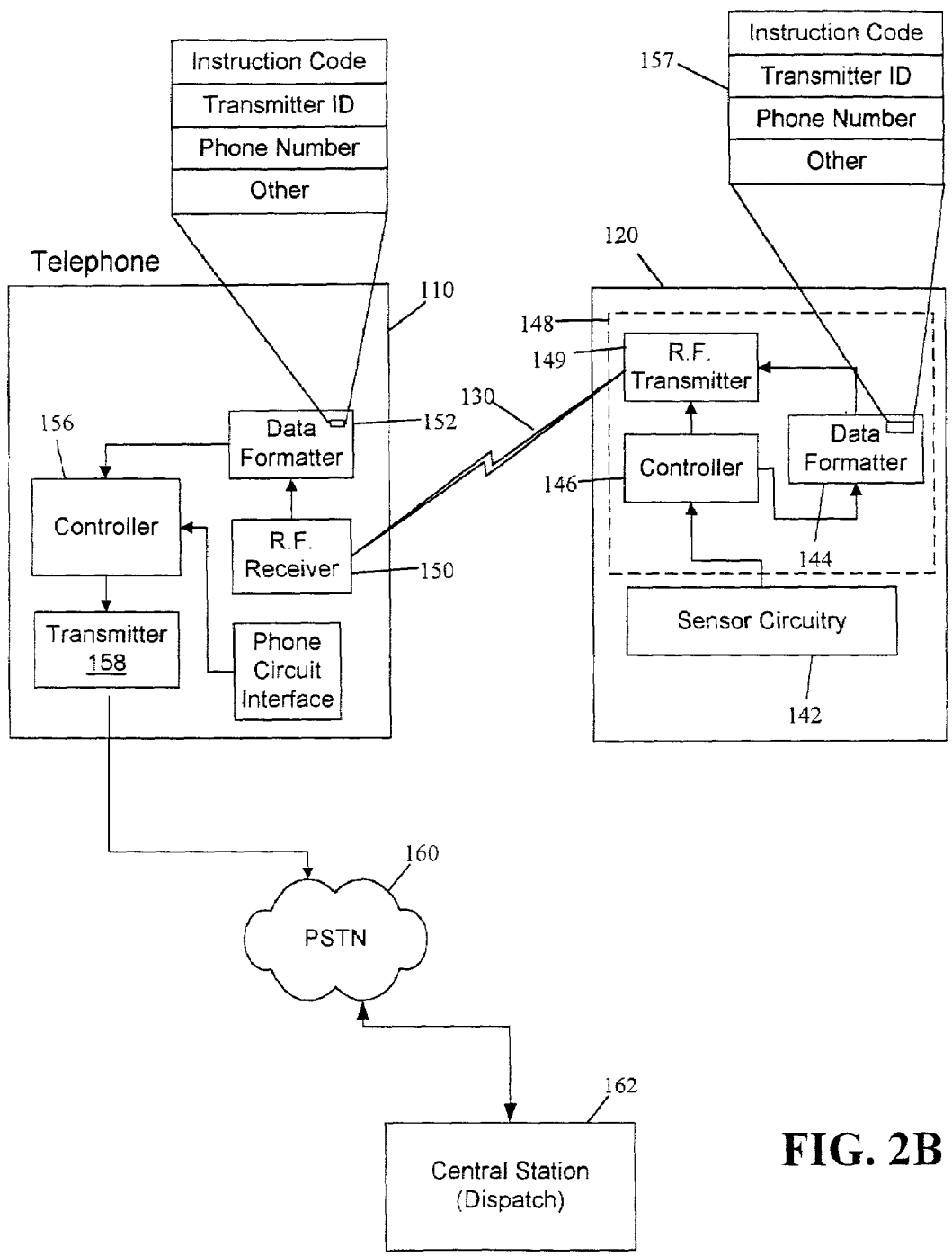

While the present invention is broadly directed to a general purpose transceiver and a method for communicating information from remote sites to a central location, before specifically describing these aspects of the invention, reference will first be made to two different illustrative environments and uses of the present invention In this regard, FIGS. 1A and 1B illustrate an environment in which information may be communicated from financial transaction machines (e.g., ATMs) to a central location, and FIGS. 2A and 2B illustrate an environment in which information may be communicated from vending machines to a central location However, it will be appreciated by persons of skill in the art from a reading of this disclosure that the present invention may have a wide variety of other uses, and a transceiver constructed in accordance with the invention may be utilized in a wide variety of environments.

Turning now to the drawings, FIG. 1 shows a system level block diagram of an automatic financial transaction. More specifically, the figure shows an automatic financial transaction machine (AFTM) 10 being remotely accessed by a transmitter 20. The AFTM 10 may be any of a number of devices, including, most commonly, an automated teller machine for banking. However, the AFTM 10 may further encompass devices such as gas pumps of the type equipped to receive credit cards for charging an otherwise cash transaction. It will be appreciated that other similar devices fall within the scope of the term In the embodiment illustrated in FIG. 1A, the AFTM 10 includes a display 12, such as a CRT, for providing a visual display to a user. A card receiving slot 14 is also shown. As is known, the card receiving slot 14 receives a plastic card such as a bank card, credit card, or some other magnetically encoded card for purposes of user identification. A key pad 16 for inputting information, such as a personal identification number (PIN), transaction amounts, and other information is also illustrated in the drawing Finally, the last functional block illustrated in the AFTM 10 of FIG. 1A is receiving unit 18 The receiving unit 18 has been illustrated in dashed lines, since it will typically reside inside the AFTM 10 The receiving unit 18 is adapted to receive a signal transmitted from a remote transmitter 20, interpreting that signal in order to allow a user access to the AFTM 10. Preferably, the receiving block 18 comprises a radio frequency (RF) receiving for receiver electromagnetic waves transmitted from an RF transmitter contained with the remote transmitter unit 20. However, consistent with the concepts and teachings in the present invention, the receiving block 18 may be configured to receive other wavelength electromagnetic signals, including ultrasonic or infrared.

A remote transmitting unit 20 is provided for remote communications with the AFTM 10 While the transmitter 20 will be described in more detail below, it broadly operates to transmit an electromagnetic signal 30 to a receiver located at the AFTM 10, wherein said electromagnetic signal is encoded with user identifying information to allow a user to gain access to the AFTM 10. In this regard, an internal transmission circuit (not shown) is provided within the transmitter 20 to act upon command to transmit the encoded electromagnetic signal 30. A transmit button 22 is provided for the user. As illustrated, the transmitter 20 is quite small and may be conveniently attached, for example, to a key ring for ready and portable use. Indeed, in one embodiment, the single transmitter constructed in accordance with the present invention may serve multiple functions For example, small transmitters of this type are known for activating and deactivating automobile alarm systems. The transmitter of the present invention may be integrally designed with such an automobile remote to provide the dual functionality of remotely controlling an automobile alarm along with the functionality of remote access to an AFTM 10. In accordance with such an embodiment, a second transmit button 24 would be provided. In this regard, the first transmit button 22 would be operative to, for example, operate the AFTM 10, while the second transmit button 24 would be operative to remotely operate the automobile alarm. It will be appreciated that the frequency, and/or format of the transmit signal 30 transmitted will be different for the different applications. For example, the signal transmitted to AFTM 10 may include account identification information, while only a unique activation sequence need be transmitted to actuate an automobile alarm.

In yet a further embodiment, additional transmit buttons (not shown) may be provided as well. To illustrate, presently people typically carry multiple banking and/or credit cards in their billfolds or purses. In accordance with one embodiment, a transmitting unit 20 may be provided with multiple transmit buttons, wherein a transmit button 22, 24 is uniquely assigned to a different banking and/or credit card Therefore, if a user has a bank checking account, and credit accounts with other financial institutions for both VISA and MASTERCARD credit cards, then three distinct transmit buttons would be provided for accessing the three different accounts. It should be appreciated that many AFTM's 10 presently allow access to a wide number and variety of accounts, including MASTERCARD, VISA, AMERICAN EXPRESS, etc. Such a machine would be constructed in accordance with the invention to recognize the transmissions from each of the different transmit buttons depressed. In accordance with the description provided below, the various user/account information will be different for each account, and therefore, the signal transmitted will be different. Providing a separate transmit button for each of these functions/account simplifies the user interface. A simpler way to envision such a transmitter 20 is to recognize that each individual credit/banking card that a user may carry in a billfold or purse would be replaced by an additional transmit button on the transmitter 20.

In use, a user would simply depress a transmit button 22, which would result in the transmitter 20 transmitting an electromagnetic signal 30 to a remote AFTM 10 Preferably, the transmitter 20 is an extremely low power transmitter, so that a user will have to be in close proximity, (e.g., several feet) to the receiver 18 of an AFTM 10 in order to use the transmitter. This would help alleviate problems which may otherwise occur if a user approaching an AFTM 10 is circumvented by a second, more distantly located user who depresses his transmit button. This extremely low-power operation also helps to prevent the unlawful interception of the electromagnetic signals In addition, in an alternative embodiment, the transmitted signal may be encrypted for further protect against such unlawful interception A receiving unit 18 disposed within the AFTM 10 receives and decodes the signal 30 The AFTM 10 then evaluates the received, decoded signal to ensure that it identifies a legitimate user/account If so, the user may then access the AFTM 10 In the case of an automatic teller machine, or other similar AFTM 10, a user may then be prompted to enter a personal identification number (PIN) into, for example, key pad 16, as an added measure of security. However, in many AFTM's, a user will not need to make any further input. For example, many gas pumps are presently automated to receive an inserted credit card and debit the corresponding account according to the amount of gasoline purchased. Presently, there is no need in these devices for a user to manually key in a personal identification number. In similar fashion, the system may be configured to operate automatically and exclusively by the depression of a transmit button on the transmitter 20.

Having now presented an overview of the basic operation of the system of FIG. 1A, reference is made to FIG. 1B which shows a more detailed block diagram of the components contained within the AFTM 10 and remote transmitting unit 20 As previously mentioned, the transmitting unit 20 includes a transmit button 22, which initiates the data transmission. The other primary functional blocks of the transmitter 20 include a memory 42, a data formatter 44, a controller 46, and an RF transmitter 48. It will be appreciated that the functional blocks shown in FIG. 1B are shown for purposes of illustration and facilitating a better understanding of the broad concepts of the system. The functional blocks of the illustrated embodiment should not, however, be viewed as specific limitations on the invention. For example, data formatter 44 and controller 46 (discussed below) may be embodied in a single functional unit. Indeed, it is contemplated that the entirety of the circuitry of the transmitter 20 will be contained within a single integrated circuit component In keeping with the description of the transmitter 20, the controller 46 lies at the heart of the transmitter 20, and serves to control the overall functionality thereof. In this regard, the controller 46 is responsive to the depression or actuation of transmit button 22 to begin the data transaction and signal transfer. More particularly, when a user depresses the transmit button 22, the controller 46 initiates the data transmission sequence by accessing an internal memory 42, which, among other things, stores user and/or account identification information. This information is then passed to a data formatter functional block 44 which places the data in an appropriate and predefined format for transmission to the AFTM 10. It is contemplated that the above-described functionality occurs in electronic format. This electronic data is then sent from data formatter 44 to an RF transmitter 48 for conversion from electric to electromagnetic form. As is well known by those skilled in the art, a variety of transducers can perform this functionality adequately.

The AFTM 10 receives the transmitted electromagnetic signal 30 at an RF receiver 50 This receiver serves to convert the data from electromagnetic format into electrical format (i.e., a digital signal) and passes that data to a data formatter 52. Also illustrated as comprising principal functional components of the AFTM 10 are the magnetic card receiving slot 14, a transducer or magnetic pick-up 54, the display 12, the keyboard 16, a block denoted as controller 56, a cloud denoted as miscellaneous 58, and a communication network (i.e., the PSTN) 60

In a manner that is well known, a magnetically encoded card is inserted into slot 14, wherein the information encoded on the card's magnetic strip is read by transducer or magnetic pick-up 54. The electric signals from this pick-up 54 are then formatted into a suitable, preferably digital, form by data formatter 52. For purposes of simplifying the description, the data formatter 52 (shown as a single block) receives signals from both the transducer 54 and the RF receiver 50. It will, however, be appreciated that the data formatting function of block 52 may be provided by two separate and distinct formatting units. In such a retrofit system, the functionality of such data formatter 52 would indeed be performed by distinct physical units.

In keeping with the description of the AFTM 10, the information received and formatted by the data formatter 52 is then transmitted to a block denoted as Controller 56 This functional block serves to verify that the information received, either from the encoded card inserted into slot 14, or the signal received by the RF receiver 50 is valid To do this, the AFTM 10 will generally access a centralized database (not shown) via the PSTN 60 It will be appreciated that this account verification functionality is well known in the prior art, and therefore, need not be discussed herein. Finally, a block 58 denoted as "transmitter" is illustrated within the AFTM 10, which controls the communication of data across the PSTN 60

As will be appreciated by those skilled in the art, the controller 56 performs a variety of functional features which depend, in part, upon the specifics of the machine 10 For example, the block will manage user input and output to and from the display 12 and keypad 16, as well as the PSTN 60 management and access. It would further serve to access any database of information that is stored locally at the AFTM 10.

As illustrated, the ATFM 10 communicates across the PTSN 60 to a central station 62 The central station 62 may comprise a database of financial and/or account information, which database may be utilized to verify user information. It may also include facilities that are capable of dispatching service personnel, if the ATFM 10 sends a message indicating that the machine, or its surrounding environment is in need of service. In this regard, the surrounding environment may refer to lighting. As is known, a certain amount of lighting is generally desired (if not required) in the immediate vicinity of an ATM A lighting failure may be an event that is sensed and transmitted by the transceiver to report a service condition for repair. For purposes of the present invention, the actual structure and/or of the central station 62 is unimportant, and thus will not be discussed in detail herein. Suffice it to say that the central station 62 may vary from implementation to implementation.

The controller 56, receiver 50, data formatter 52, and transmitter 58 may all be provided on an open-ended transceiver constructed in accordance with the present invention Reference is now made to FIGS. 2A and 2B, which illustrate another environment of the present invention. Specifically, the environment illustrated in these figures is one which provides for the automated service of a vending machine 120. In this regard, a vending machine 120, such as a soda dispensing machine, includes an internal transmitter 148 that communicates information to a nearby transceiver (not shown in FIG. 2A, but illustrated in FIG. 4). In accordance with this illustrated embodiment, the transceiver is incorporated into a public, pay-type telephone 110. However, and as will be appreciated, the transceiver may be incorporated into a variety of devices, so long as it has access to a phone line, preferably one forming a part of the PSTN.

Internally, the transceiver includes receiver circuitry for receiving the transmitted signal 130 and a transmitter for communicating data via the PSTN 160 to a central station 162 In this regard, the central station 162 may be a central dispatch location, that is set up to dispatch service personnel to attend to the vending machine 120. As will be appreciated, the vending machine 120 may encompass a wide variety of devices, in addition to a soda dispensing machine For example, the vending machine 120 may include a snack dispensing apparatus, a candy dispensing apparatus, a cigarette dispensing apparatus, a newspaper dispensing apparatus, an ice dispensing apparatus, among a laundry list of other devices.

A variety of sensors (not shown) may be provided in the vending machine 120 for detecting a variety of events. For example, detecting whether the machine is low on a given product, or out of a product, determining whether the machine is out of change; determining if the machine has taken in a predetermined amount of money, which should be emptied; detecting if the machine is out of order; etc. These, and other events sensed within the vending machine 120 may be communicated to the transmitter 148, which then formats the data in a way that it may be readily understood by the transceiver. The transmitter 148 then transmits the data (via RF link 130) to the transceiver disposed within the telephone 110. This information, in turn, is communicated from the transceiver via PSTN 160 to a central station 162. Based upon the information received, the central station 162 will institute an appropriate response. For example, if the information received is a notification that one or more of the products in the vending machine 120 is either low or out, then a first person may be dispatched to restock the machine If, on the other hand, the information received is a notification that the machine is out of order, then a second person (service person) may be dispatched to service the machine.

Having broadly described the vending machine service environment, reference is now made to FIG. 2B, which illustrates the circuitry within the vending machine 120, as well as the circuitry within the telephone 110, for carrying out the inventive aspects. In this regard, the various sensors disposed within the vending machine are broadly denoted by the block labeled "Sensor Circuitry" 142. The outputs of the various sensors may be directed to a controller 146, which may comprise dedicated circuitry or may alternatively comprise general purpose programmable hardware, such as a microprocessor or microcontroller. The controller 146, in essence, handles the processing of most of the functional operations carried out at the vending machine 120.

In this regard, and as will be discussed in more detail below, the transceiver of the present invention is characterized by an open-ended architecture that is configured to receive an encoded instruction. This encoded instruction may be decoded to identify specific and unique functions and/or instructions. For example, one code may uniquely describe the event of the vending machine 120 running out of a certain product. Although this code may be meaningless to the transceiver, when decoded by the central station 162, an appropriate action may be taken. Thus, a vending machine company may utilize a given code to define a certain event relevant to the vending machine, while a banking enterprise may utilize the same code to define a completely different event. Nevertheless, the same general purpose transceiver may be used to implement both embodiments.

In keeping with a description of the vending machine 120, the controller 146 is preferably configured to receive sensor outputs and compose the appropriate instruction code for transmission to the transceiver. A block called "Data Formatter" 144 may also be provided within the vending machine 120. As the name implies, this block formats the data for transmission to the transceiver It will be appreciated that, in addition to the instruction code, other information may also be supplied by the transmitter 148. As illustrated by the block 157 (exploded from the Data Formatter block 144), information such as a transmitter identification code, and a destination phone number may also be included in the information transmitted to the transceiver. In this regard, the transmitter identification code uniquely identifies the transmitter, which code may be decoded at the central station to identify the specific vending machine that is originating the message. That is, the instruction code may inform the central station 162 as to the particular service need of the vending machine 120, and the transmitter identification code may inform the central station 162 of the particular vending machine 120, and thus its location, in need of service.

Finally, the data formatter may also include the phone number of the central station 162; namely, phone number that the transceiver is to dial over the PSTN 160. In this way, a generic (open-ended) transceiver may be utilized and installed in mass within public, pay-type telephones, by the service provider. Thus, various companies may then utilize specially configured transmitters 148 to communicate with the general purpose transceiver to communicate a wide variety of information to central locations, defined by the transmitters.

Figure 3:
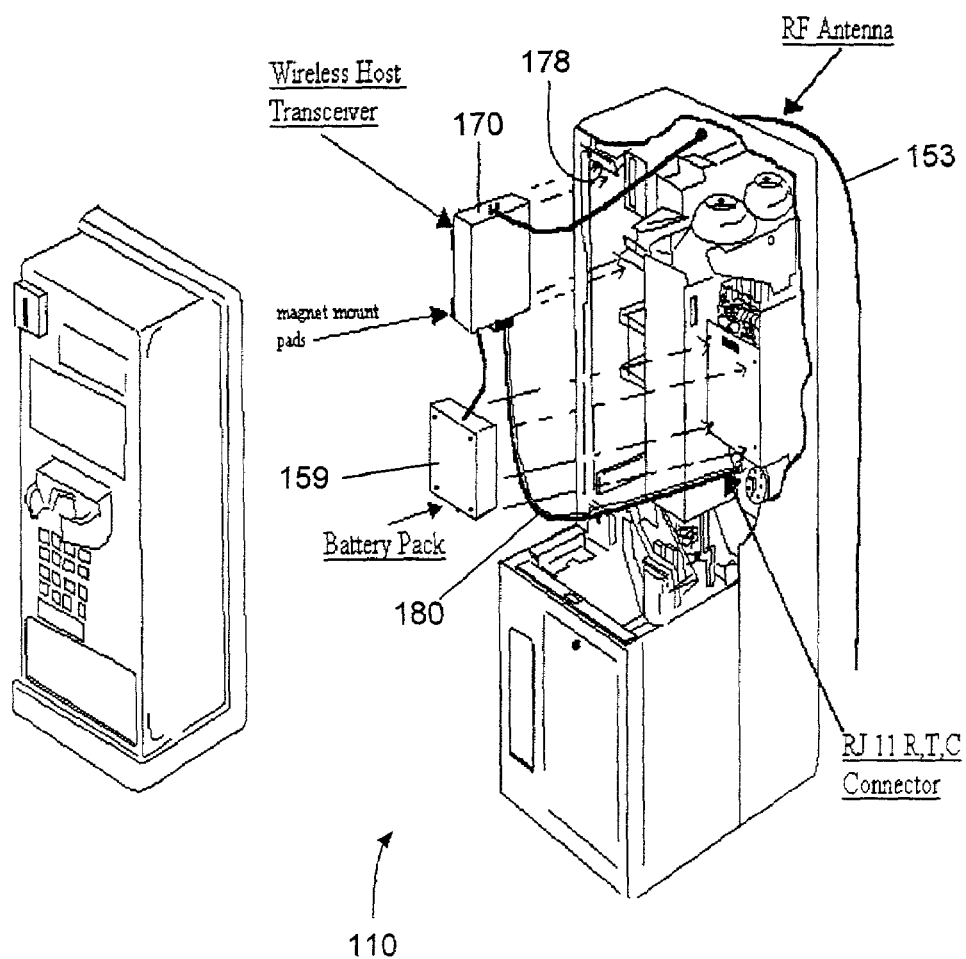
FIG. 3 is an exploded perspective view of a telephone housing a transceiver constructed in accordance with the invention.

FIGS. 1A, 1B, 2A, and 2B illustrate two different environments in which the present invention may operate, it will be appreciated that a variety of other environments may use or implement the invention as well Reference is now made briefly to FIG. 3, which is an exploded perspective view of a telephone 110 incorporating a transceiver 150 constructed in accordance with the present invention In this regard, the transceiver 150 may be provided in a single module having an associated battery pack 151. Alternatively, the transceiver 150 could be designed to operate from the power supplied to the telephone. As illustrated, the module 150 may be configured to snap into a space provided in the telephone, and maintained by a pair or resilient fingers 178.

An external wire 153 may be provided to act as an antenna for the RF receiver. Alternatively, a smaller internal antenna may be provided. As will be appreciated by one of ordinary skill in the art, the output from the transceiver is via cable 180, which may terminate at an RJ11 connector, having Ring, Tip, and Common conductors.

Figure 4:
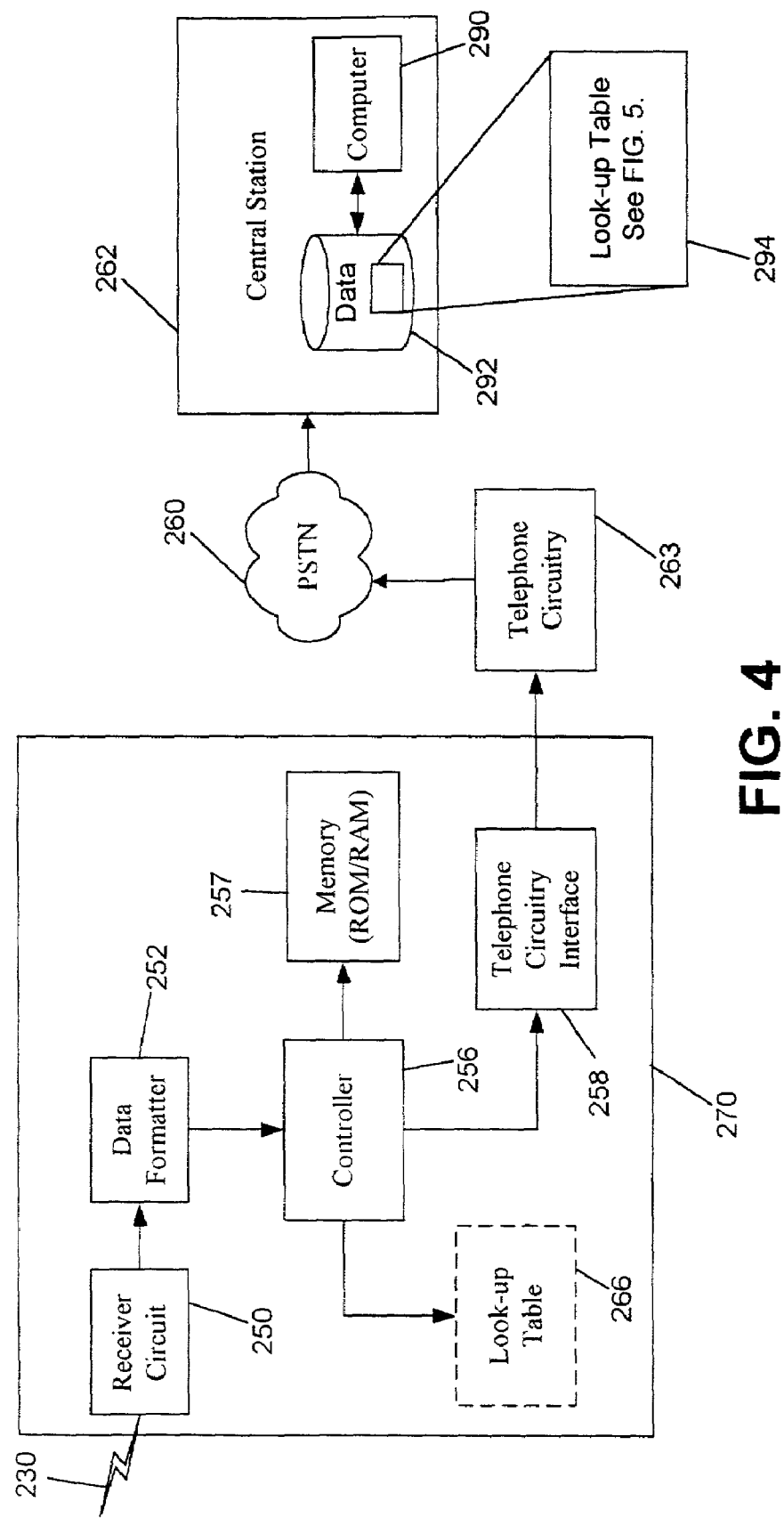
FIG. 4 is a block diagram illustrating a transceiver constructed in accordance with one embodiment of the invention.

Reference is now made to FIG. 4 which illustrates (generically) a system constructed in accordance with the present invention. The drawing more specifically illustrates an open-ended transceiver 170 constructed in accordance with the present invention. In this regard, the transceiver 170 includes a receiver circuit 250 that is configured to receive an electromagnetic signal (e.g., RF, optical, etc.) As described above, this signal includes an instruction code, and possibly other items such as a phone number, a transmitter identification code, etc A data formatter 252 is provided in connection with a controller 256 to further format a signal that is to be output from the transceiver 270 to the central station 362. In this regard, additional information may be added to the signal that is transmitted to the central station 362.

For example, a transceiver identification code may be added to the signal Although the central station may decode the transmitter identification code (if provided) to identify, for example, a geographic location of a transmitter, in environments where the transmitter is a mobile (i.e., handheld), a transmitter identification code may be of no use in identifying a geographic location. In such an environment, the addition of a transceiver code will facilitate the identification of the transmitter location (recognizing that the transmitter will be located in the proximity of the transceiver 270).

The controller 256 preferably performs the overall control and synchronization of functional operations within the transceiver 270. In this regard, the controller 256 may be a general purpose microprocessor or microcontroller. If so, memory 257 will be provided to store programmable code for controlling the operation of the controller 256. Telephone circuitry 258 may also be provided for interfacing to the telephone circuitry 263 within the telephone 110. The telephone 110 typically has circuitry configured to interface with the local loop of the PSTN 260. The interface 258 within the transceiver 270 is designed to interface with this typical/standard telephone circuitry 263. The specific implementation of the circuitry of block 258 will be appreciated by persons skilled in the art and need not be described in detail herein.

A look-up table 266 is also illustrated in FIG. 4. It is illustrated in dashed line to represent that it may be optionally provided within the transceiver 270 Consistent with the broader concepts of the invention, in certain embodiments, it may be desired to provide a more application specific transceiver 270. In such embodiments, a look-up table 266 may be provided within the transceiver for decoding information such as the instruction code, the transmitter identification code, or any other information that may be transmitted from the transmitter. The specific use of such data will necessarily be application specific and controlled by the controller 256, and need not be described herein.

At the central station 262, a computer 290 may be provided to receive and process data received from the transceiver 270 via the PSTN 260. In this regard a database 292, including a look-up table 294, may be provided. Since the present invention is directed to the transceiver 270, a variety of platforms may actually be implemented at the central station 262. It will be appreciated, however, that with a computer 290 implementation, an extremely flexible and robust operation may be achieved. For example, the response of the central station 262 to various incoming messages may be programmed to vary depending upon the contents of the message.

By way of illustration, suppose in incoming message identifies a particular vending machine that is out of a given product. The computer 290, upon recognizing this condition, may alert the appropriate person that is to restock the machine. To this end, the computer may so notify the person by sending the person an email message Similarly, suppose the computer recognizes the incoming message as identifying that a particular vending machine is out of order, then the computer 290 may alert a different person that the machine is in need of technical service. In order to identify the contents of the various incoming messages, the central station 262 may employ a look-up table, like that illustrated in FIG. 5

Referring to FIG. 5, a look-up table is illustrated. Although the look-up table 294 may take on a wide variety of forms, the table illustrated in FIG. 5 includes two columns of data. The first column is a listing of the various instruction codes that are transmitted by the transmitter to the transceiver, and forwarded by the transceiver to the central station. The second column contains the specific functions or instructions that correspond to the transmitted/received instruction code. Thus, by looking up the instruction code within the table 294, the computer 290 at the central station can readily identify the function or instruction that is to be executed. For example, one code may indicated that a particular vending machine "n" is low on a specific product "X". Another code may indicate that a person "Y" is in distress. Yet another code may indicate that an industrial trash compactor "m" is in need of service Thus, in one embodiment, the instruction codes themselves may be encoded to uniquely identify particular machines or persons. More particularly, in the illustrated embodiment, instruction code 00000001 identifies that vending machine "n" is low on product "X". In yet another embodiment, this same code may indicate that a vending machine (generally) is low on a product (generally) Additional codes may be generated at the transmitter and decoded at the central station to provide this more specific information For example, a transmitter identification code may be decoded by the central station to identify the specific vending machine that is low on product Likewise, an additional code, such as a product code, may be generated by the transmitter to identify the specific product that is low. Thus, in such an alternative embodiment, as many as three different look-up tables may be utilized at the central station 292.

Figure 6:
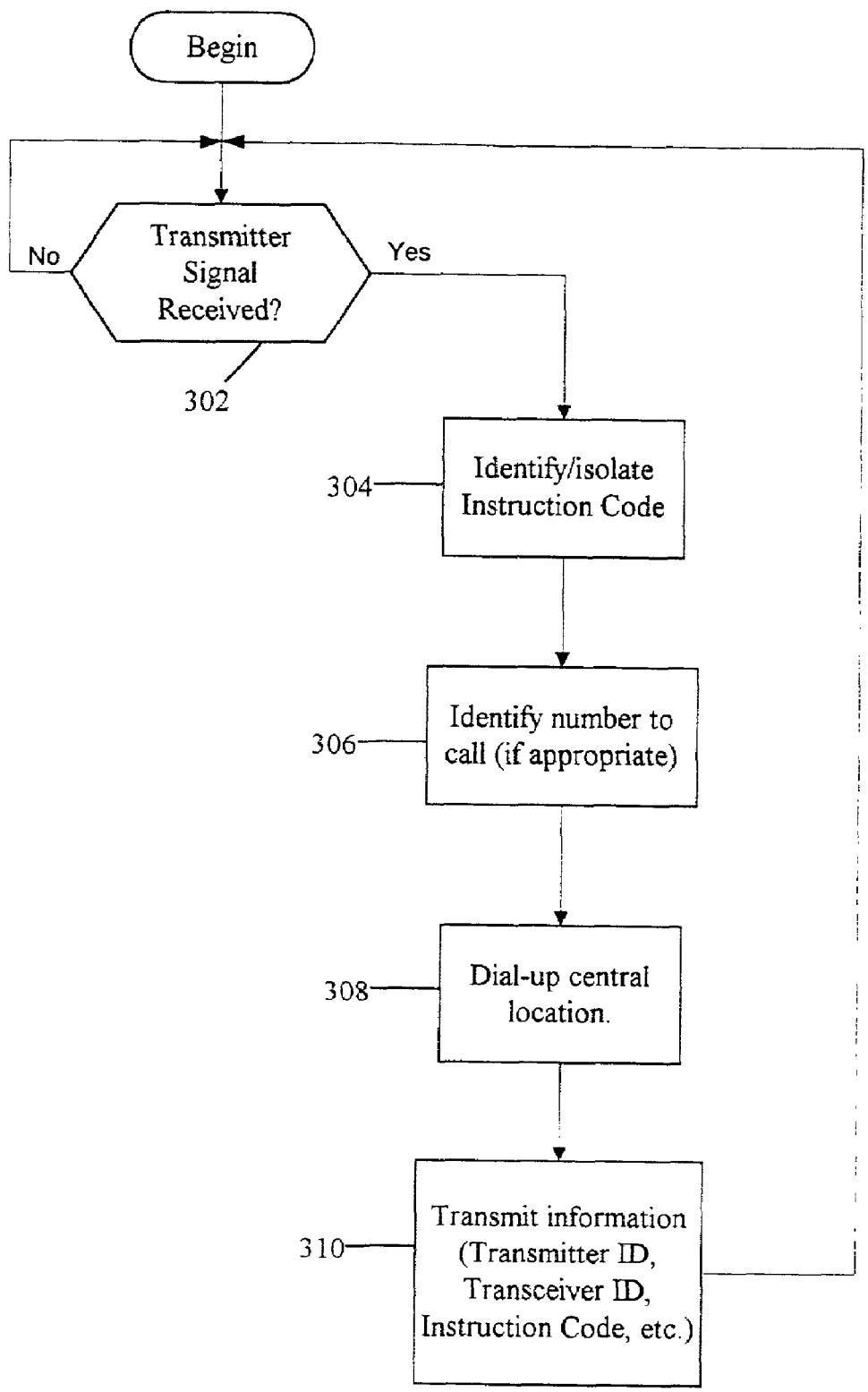
FIG. 6 is a flowchart illustrating the top-level functional operation of a transceiver constructed in accordance with one embodiment of the present invention.

Having described the transceiver of the present invention, and illustrated its use in differing embodiments, reference is now made to FIG. 6, which is a flowchart that depicts the top-level functional operation of a transceiver constructed in accordance with one embodiment of the invention. In this regard, the transceiver awaits the receipt of a signal transmitted from a transmitter (step 302). Upon receipt of a transmitted signal, the transceiver (through the controller and data formatter) looks to identify and/or isolate the instruction code (step 304). The transceiver also looks, if appropriate, to identify a phone number of a central station (step 306). The transceiver then dials this central station, establishing a connection over the PSTN (step 308).

In this regard, the transceiver may be configured to seize the phone line. Thus, anyone making a call or any call currently in progress would be disconnected Alternatively, the transceiver (through the controller) may be configured to test the phone line for its present availability. If a call is in progress, the controller may store the message received from the transmitter and await the availability of the phone line Once the phone line becomes available, then the transceiver may assume the line and place its call In yet a further embodiment, the transceiver may be configured to implement simultaneous voice/data technology to place the phone call to the central station without interrupting any ongoing call. In an even more complex embodiment, a different service may be provided in connection with the telephone 110 through which to place the call. For example, the telephone 110 may also be equipped with an ISDN service or a DSL service, through which the transmitted is communicated. As is known, communication through such a service may be made without any interruption to a call ongoing in the POTS frequency band.

Finally, the transceiver transmits the message, including the instruction code, and, if relevant, the transmitter identification code, the destination phone number, the transceiver identification code, etc. (step 310).

Figure 7:
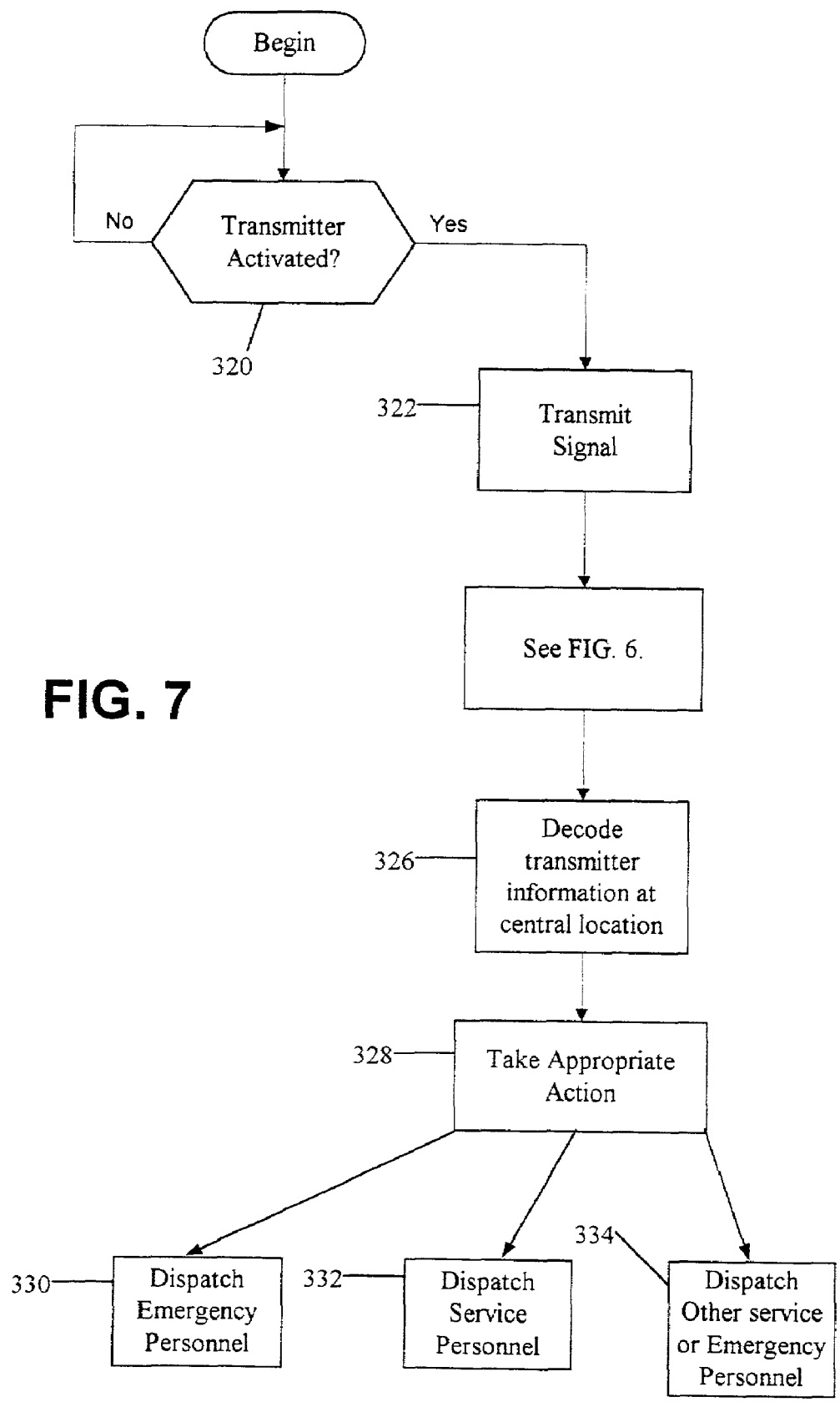
FIG. 7 is a flowchart illustrating the top-level functional operation of a system constructed in accordance with one embodiment of the present invention.

Referring now to FIG. 7, a flowchart is shown that illustrates the top-level functional operation of a system, in accordance with one aspect of the invention. In this regard, the system remains in an idle state, until the transmitter becomes activated (step 320) This activation may result from a user depressing a manual button on a transmitter or by an event triggering an input to a transmitter. Upon activation, the transmitter transmits a signal, including at least an instruction code (step 322). Thereafter the transceiver operates in accordance with the flowchart of FIG. 6. The central station then decodes information received via the PSTN (specifically decoding the instruction code)

Based upon the decoded instruction code (and perhaps other codes in some embodiments), the central station initiates an appropriate action in response For example, in response to a distress call, the central station may dispatch emergency personnel (step 330) In response to a service request, the central station may dispatch service personnel 332. In response to other types of messages or requests, the central station may dispatch other personnel or take other appropriate action (step 334).

Figure 8:
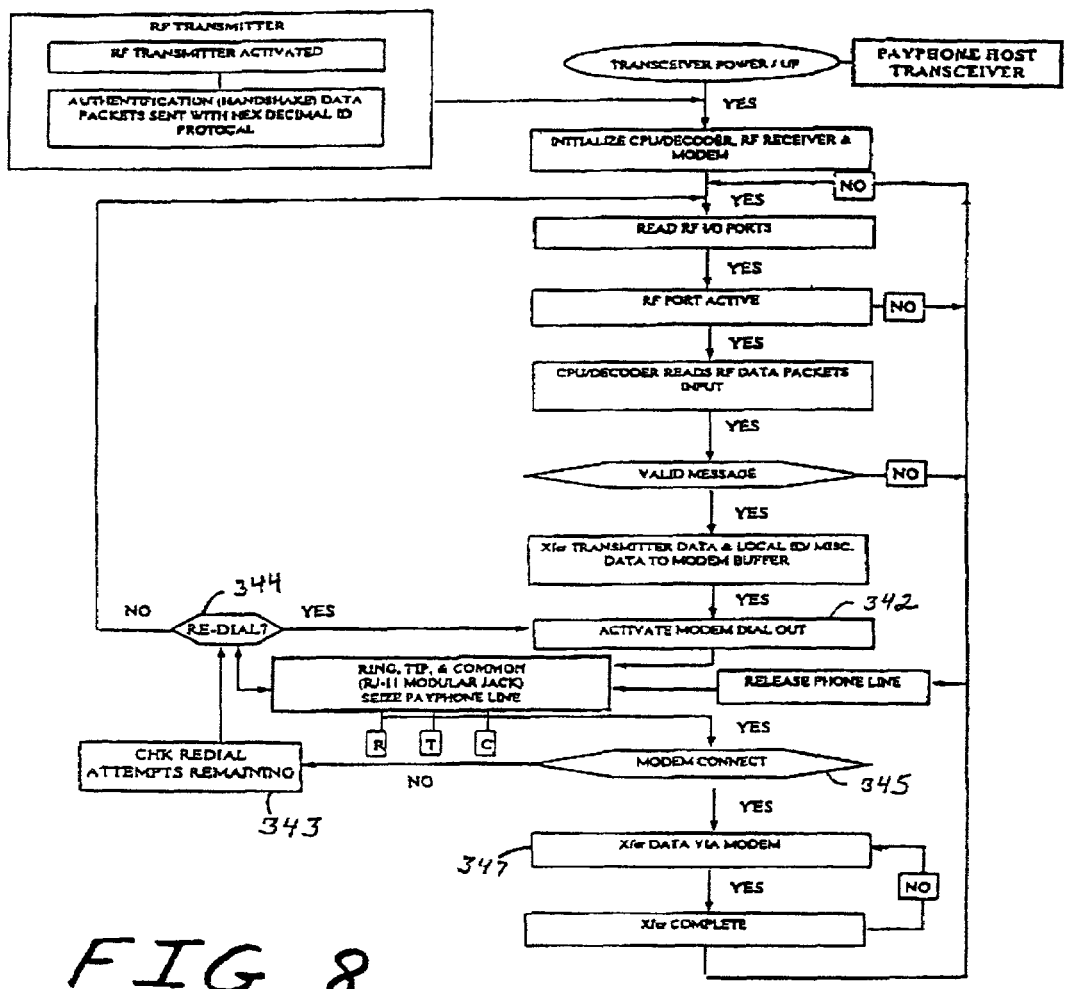
FIG. 8 is a flowchart illustrating a more detailed operation of system constructed in accordance with the present invention.

Having described the top-level functional operation of the invention, reference is made to FIG. 8, which is a flowchart that depicts the operation of the system from more of a hardware level, as opposed to a functional level. The flowchart of FIG. 8 will not be described herein in detail, as a person of ordinary skill in the art will appreciate the system operation simply from a review of the flowchart and the nomenclature provided therein. For example, block 342 indicates the activation of the modem within the transceiver to dial-out onto the PSTN. The decision block 345 evaluates whether an appropriate connection has been established. If so the system proceeds to step 347 to transfer data. Alternatively, the system returns to steps 343 and 344 to attempt a redial.

It should be appreciated that the foregoing description has been presented for purposes of illustration and description. Various alternative embodiments may be implemented completely consistent with the concepts and teachings of the invention. Indeed, the encoded message transmitter 148 is, preferably, different that described above. In this regard, the message preferably transmitted is, in its most basic form, a fourteen byte message, defined by Table 1 below.

TABLE 1

| Byte | Description |
| --- | --- |
| 1-4 | "To" Address - Four Hex Bites |
| 5-8 | "From" Address - Four Hex Bytes |
| 9 | Message Number |
| 10-11 | Packet Number |
| 12 | Byte Count (14-255) |
| 13 | Command (instruction code) |
| 14 | Data |
| 15 | Check Sum - Hex (modulo 8) |

Thus, in the preferred embodiment, the message transmitted defines the destination of the central station by the "To" address, which is a logical IP address. Thus, the transceiver may be configured to establish a connection with a predetermined remote number, which may this allow message routing in accordance with the IP protocol, using the Internet In this regard, bytes 1-4 of the message define the destination to which the message is routed.

When the central station receives the message, it may evaluate the "From" address, which will be unique to a given transmitter. This address, in turn defines the physical (i.e., geographic) location of the transmitter. That is, in many embodiments, knowing that a given transmitter was installed in a given device allows the central station 262 to known the location of the transmitter 148.

Byte 13 defines the command or instruction code that is relayed to the central station In accordance with the general purpose nature of the system, a second byte (actually variable in size), permits the passage of data if necessary. For example, byte 13 may be encoded to indicate that a given product in a vending machine is low on stock. Further detail, such as a description of the product, may be passed in byte 14. In an alternative embodiment, this byte may be used to communicate other data. For example, in an embodiment where the transmitter is a hand-held transmitter, a panic button may be provided. The instruction code may be encoded to convey "help" or distress command (See, for example, U.S. Pat. No. 5,714,931, assigned to the assignee of the present invention, and is hereby incorporated by reference). The data field of byte 14 may be encoded to include personal data about the person carrying the transmitter In a banking environment, the instruction code may be one that requests access to an account, while the data field may convey the track one data, typically carried on the magnetic strip of a magnetic card.

In yet another embodiment, a transmitter may be provided on an automobile. Sensors may be disposed in numerous locations throughout the car. In this regard an automobile manufacturer may include a variety of diagnostic sensors covering a variety of the mechanical and electrical systems on the automobile If a system malfunctions, causing the car to break down, the transmitter may encode the relevant data into the data field of the transmitted message In this regard, the instruction code may be that the car is broken down and the data may be the data relevant to diagnose the reason for the breakdown Using this diagnostic information, a service person may be dispatched to the site of the vehicle with the necessary component(s) to service the vehicle, rather than simply dispatching a tow-truck to tow the vehicle to a service location (depending of course on the nature of the service required).

In embodiments such as a personal transmitter, an automotive transmitter, and other embodiments where the nature of the transmitter is necessarily mobile, the transmitter may also include global positioning system (GPS) circuitry. Thus, when the message is transmitted, the data field may also include the relevant GPS location, so that the geographic location of the transmitter may be readily identified and located.

In this regard, byte 14 is actually variable in length. It may vary from 0 to 241 bytes in length. To this end, byte 12 (byte count) will specify the size of the message, which in turn defines the number of bytes in the data field of the message. In the unlikely event that even more information is desired to be transmitted, the protocol defined in Table 1 allows for ready expandability In this regard bytes 9-11 define a message number and a packet number. Up to 255 messages can be sent in a burst transmission, and up to 65,536 packets may be strung together. In this way, the central station, upon receiving multiple burst transmissions may use the message number and packet number to reconstruct a relatively lengthy message transmission that is broken up over an number of successive transmissions.

Although it is preferred to implement the present invention through an open-ended transmission protocol, as defined above, it will be appreciated that the concepts and teachings of the present invention are not so limited. In fact, for purposes of the present invention, the message transmitted by the transmitter may be as simple as an instruction code that defines some condition, that a central station may decode and act upon. In such an embodiment, the transceiver may be specially configured to establish a phone connection with a predetermined central station.

In yet another embodiment, the transmitter may encode a message that transmits both an instruction code and a phone number that the transceiver is to establish a connection with. Such an embodiment, allows a generic transceiver to be utilized, such that multiple enterprises may utilize this common, generic transceiver for various applications Consistent with these broad concepts, a variety of other configurations may be employed as well.

Indeed, the foregoing description has been presented for purposes of illustration and description. It is not intended to be exhaustive or to limit the invention to the precise forms disclosed Obvious modifications or variations are possible in light of the above teachings. For example, the transceiver has been illustrated herein having a transmitter configured to communicate across the PSTN. However, it will be appreciated that the transmitter may, consistent with the concepts and teachings of the present invention, be similarly configured to communicate via cellular technology as well. For example, in embodiments such as the automobile embodiment described above, it may be desirable to use a cellular transmitter, instead of a low-power RF transmitter This may be desired because the automobile may break down a relatively significant distance from the nearest pay-type telephone (e.g., location of the nearest transceiver). Thus, a transmitter in the automobile may establish a cellular communication link to a predetermined telephone number and convey the information in a similar message structure.

In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled

What is claimed is:

1. A system for communicating information to a predetermined location, the system comprising:
   an extremely low-power transmitter configured to wirelessly transmit an extremely low-power signal comprising information, the information comprising an instruction code corresponding to an instruction to be followed, a transmitter identification number that uniquely identifies the transmitter, and a network address number that comprises at least one of a telephone number or a to address;
   a central location configured to receive the information and communicate via at least one of a telephone line in the public service telephone network (PSTN) or a computer network, the central location further configured to decode the instruction code and initiate steps to implement the instruction; and
   a transceiver, located remote from, but in close proximity to the extremely low-power transmitter and configured to establish a communication link with the central location based on one of the telephone number or the to address included in the low-power signal, the transceiver comprising:
   a line interface circuit configured to interface with one of the telephone line or the computer network; and
   a controller configured to receive the low-power signal and communicate the information to the central location along with a unique transceiver identification number.

2. The system of claim 1, wherein the low power signal further comprises a logical IP address such that the transceiver can route the information to the central station.

3. The system of claim 1, wherein the transmitter is configured to transmit a low power radio frequency (RF) signal.

4. The system of claim 1, wherein the information comprises a transmitter identifier code, a unique transmission destination address, and a burst transmission length identifier.

5. The system as defined in claim 4, wherein the transmitted signal further comprises: a message identification field; a packet identification field; and a data field.

6. The system as defined in claim 5, wherein the transmitted signal further comprises: a field adaptively configured for data transmission error correction.

7. The system as defined in claim 5, wherein the transmitted further comprises: a field configured to indicate to a destination device that a subsequent to follow.

8. The system as defined in claim 4, wherein the unique tray destination address is an Internet protocol (IP) address.

9. The system of claim 1, wherein the controller is further configured to communicate a transceiver identification code to the central station.

10. The system of claim 9, wherein the central location comprises means for evaluating the transceiver identification code.

11. The system of claim 10, wherein the evaluating means further determines geographical location of the transceiver based upon the transceiver identification code.

12. The system of claim 1, wherein the central location comprises means for notifying service personnel in response to the information.

13. A method for communicating information to a predetermined location, the method comprising:
wirelessly transmitting an information signal from an extremely low-power transmitter to a remote transceiver, wherein the information signal is an extremely low-power signal including a telephone number of a central location, the information signal further comprising an instruction code corresponding to an instruction to be followed, a service code corresponding to a requested service, and information regarding automotive diagnostic information;
receiving the information signal by remote transceiver, the remote transceiver situated proximate to the low-power transmitter;
placing a telephone call from circuitry coupled to the transceiver to the central location identified by the telephone number via a phone line which comprises part of a public switched telephone network (PSTN);
communicating at least a portion of the information signal from the transceiver to the central location; and
decoding at least a portion of the information signal by the central location to identify the instruction and the requested service, and to analyze the automotive diagnostic information.

14. The method of claim 13, wherein the method further comprises: communicating a transceiver identification code from the transceiver to the central location in addition to a transmitter identification code that corresponds to the low-power transmitter.

15. The method of claim 14, wherein decoding further comprises: decoding the transceiver identification code.

16. The method of claim 14, wherein the method further comprises: evaluating the transceiver identification code; and determining a geographical location of the transceiver.

17. The method of claim 13, wherein the information signal further comprises a transmitter identification code.

18. The method of claim 17, wherein decoding further comprises: decoding the transmitter identification code.

19. The method of claim 18, wherein the method further comprises: evaluating the transmitter identification code, and determining a geographic location of the transmitter based upon the evaluating step.

20. The method of claim 13, wherein the information signal further comprises a logical IP address of the central location.

21. A system for communicating information to a central location, the system comprising:
means for wirelessly transmitting an extremely low-power signal comprising information, the information including a telephone number an instruction code that corresponds to an instruction, and at least one of a product code and user account information;
means for receiving the extremely low-power signal, the means for receiving being remote but within close proximity to the wireless transmitting means;
means for transmitting the information to the central location identified by the telephone number via at least one of a public service telephone network (PS TN) or a computer network, the means for transmitting configured to enable both data and voice communications at the same time to enable simultaneous occurrence of a phone call and a data transmission; and
means for receiving the information at the central location, the means for receiving configured to decode the instruction code and implement an associated instruction that corresponds to at least one of the product code or user account information.

22. The system of claim 21, wherein the low powered signal further comprises a logical IP address, and wherein the means for telephonically transmitting accesses the central location via the logical IP address.

23. The system of claim 21, wherein the low power signal is a low power RF signal.

24. The system of claim 21, wherein the low power signal is a low power infrared (IR) signal.

25. The system of claim 21, wherein the low power signal is a low power ultrasound signal.

26. The system of claim 21, wherein the low powered signal comprises a transmitter identifier code, a unique transmission destination address, and a burst transmission length identifier.

27. The system of claim 21, wherein the means for telephonically transmitting further communicates a transceiver identification code of the means for receiving the information.

28. The system of claim 27, wherein the means for receiving the low powered signal further comprises the means for evaluating the transceiver identification code.

29. The system of claim 28, wherein the evaluating means further determines a geographical location of the transceiver.

30. The system of claim 21, wherein the means for receiving the low powered signal further comprises means for notification in response to the information.

31. A transceiver that wirelessly communicates with an extremely low-power transmitter and telephonically communicates with a central location, the transceiver comprising:
a wireless receiver configured to wirelessly receive an extremely low-power signal, the extremely low-power signal being wirelessly transmitted in close proximity to the receiver, the extremely low-power signal comprising encoded information and a telephone number, the encoded information comprising at least an instruction code and a service code, the telephone number corresponding to a central location associated with the instruction code and the service code;
a telephonic transmitter configured to transmit a formatted electric signal over a telephone line to the central location identified by the telephone number, the telephone line comprising part of the public switched telephone network (PTSN); and a controller comprising:
- a first portion, connected to the wireless receiver, configured to obtain the information encoded in the received extremely low-power signal; and
- a second portion, connected to the telephonic transmitter, configured to deliver the obtained information to the transmitter such that the transmitter can transmit the information to the central location that is associated with the instruction code and the service code.

32. The transceiver of claim 31, wherein the controller is a programmable circuit.

33. The transceiver of claim 31, wherein the controller further comprises a look-up table configured to decode the encoded information.

34. The transceiver of claim 31, wherein the low power signal is a low power RF signal.

35. The transceiver of claim 31, wherein the low power signal is a low power IR signal.

36. The transceiver of claim 31, wherein the low power signal is a low power ultrasound signal.

37. A method for relaying an electronic message from an extremely low-power transmitter to a central location, the method comprising:

- wirelessly transmitting an information signal from a transmitter to a remotely located transceiver, the information signal comprising a unique message code and a phone number of a central location corresponding to an instruction code contained within the unique message code, wherein the transmitter is in close proximity to the transceiver thereby enabling the transmitter to transmit information to the transceiver;
- receiving the information by the remotely located transceiver;
- placing a telephone call from the transceiver to the central location, the central location being identified by the phone number contained within the information signal, over a phone line comprising part of a public switched telephone network (PSTN); and
- communicating the unique message code from the transceiver to the central location, the central location being configured to take steps to implement the instruction code in response to the transmitted information signal.

* * * * *